US010917568B2

(12) United States Patent
Bleyer et al.

(10) Patent No.: US 10,917,568 B2
(45) Date of Patent: Feb. 9, 2021

(54) LOW-POWER SURFACE RECONSTRUCTION

(71) Applicant: MICROSOFT TECHNOLOGY LICENSING, LLC, Redmond, WA (US)

(72) Inventors: Michael Bleyer, Seattle, WA (US); Marc Andre Leon Pollefeys, Zurich (CH); Yuri Pekelny, Seattle, WA (US); Raymond Kirk Price, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 42 days.

(21) Appl. No.: 16/234,924

(22) Filed: Dec. 28, 2018

(65) Prior Publication Data
US 2020/0213527 A1 Jul. 2, 2020

(51) Int. Cl.
| G06T 7/55 | (2017.01) |
| H04N 13/271 | (2018.01) |
| H04N 5/232 | (2006.01) |
| G06T 7/521 | (2017.01) |
| G06K 9/62 | (2006.01) |
| G06K 9/72 | (2006.01) |
| G06T 17/20 | (2006.01) |

(52) U.S. Cl.
CPC ...... *H04N 5/232411* (2018.08); *G06K 9/6261* (2013.01); *G06K 9/6267* (2013.01); *G06K 9/72* (2013.01); *G06T 7/521* (2017.01); *G06T 7/55* (2017.01); *G06T 17/20* (2013.01); *H04N 13/271* (2018.05); *G06T 2207/10012* (2013.01); *G06T 2207/10028* (2013.01); *G06T 2207/10048* (2013.01)

(58) Field of Classification Search
CPC ......... H04N 13/271; H04N 5/147; G06T 7/55
USPC ......................................................... 348/46
See application file for complete search history.

(56) References Cited

U.S. PATENT DOCUMENTS

| 9,639,943 B1 | 5/2017 | Kutliroff et al. |
| 2011/0285825 A1* | 11/2011 | Tian ...................... H04N 9/646 348/47 |
| 2013/0286017 A1* | 10/2013 | Marimon Sanjuan ...................... G06T 15/00 345/427 |

(Continued)

OTHER PUBLICATIONS

"International Search Report and Written Opinion Issued in PCT Application No. PCT/US19/067711", dated Mar. 25, 2020, 10 Pages. (MS# 405568-WO-PCT).

*Primary Examiner* — Amir Shahnami
(74) *Attorney, Agent, or Firm* — Workman Nydegger

(57) ABSTRACT

Systems are provided for performing surface reconstruction with reduced power consumption. A surface mesh of an environment is generated, where the surface mesh is generated from multiple depth maps that are obtained of the environment. After the surface mesh is generated, a change detection image of that environment is captured while refraining from obtaining a new depth map of the environment. The change detection image is compared to the surface mesh. If a difference between the change detection image and the surface mesh is detected and if that difference satisfies a pre-determined difference threshold, then a new depth map of the environment is obtained. The surface mesh is then updated using the new depth map.

19 Claims, 21 Drawing Sheets

(56) References Cited

U.S. PATENT DOCUMENTS

| | | | |
|---|---|---|---|
| 2014/0037135 A1* | 2/2014 | Kutliroff | G06F 3/017 382/103 |
| 2014/0092439 A1* | 4/2014 | Krig | G06T 9/001 358/2.1 |
| 2014/0307047 A1 | 10/2014 | Kirk et al. | |
| 2016/0170603 A1* | 6/2016 | Bastien | G06T 7/80 348/49 |
| 2017/0230641 A1 | 8/2017 | Scavezze et al. | |
| 2018/0285052 A1* | 10/2018 | Eade | G06F 3/04815 |
| 2020/0105013 A1* | 4/2020 | Chen | G06T 7/75 |

* cited by examiner

LOW-POWER SURFACE RECONSTRUCTION

BACKGROUND

Mixed-reality ("MR") systems, which include virtual-reality ("VR") and augmented-reality ("AR") systems, have received significant attention because of their ability to create truly unique experiences for their users. For reference, conventional VR systems create a completely immersive experience by restricting users' views to only VR environments. This is often achieved through the use of a head-mounted device ("HMD") that completely blocks any view of the real world. Consequently, a user is entirely immersed within the VR environment. In contrast, conventional AR systems create an AR experience by visually presenting virtual images (i.e. "holograms") that are placed in or that interact with the real world.

As used herein, VR and AR systems are described and referenced interchangeably. Unless stated otherwise, the descriptions herein apply equally to all types of MR systems, which (as detailed above) include AR systems, VR systems, and/or any other similar system capable of displaying virtual images. As used herein, the term "virtual image" collectively refers to images rendered within a VR environment as well as images/holograms rendered in an AR environment.

Some of the disclosed MR systems use one or more on-body devices (e.g., the HMD, a handheld device, etc.). The HMD provides a display that enables a user to view overlapping and/or integrated visual information in whatever environment the user is in, be it a VR environment, an AR environment, or any other type of environment. Continued advances in hardware capabilities and rendering technologies have greatly improved how MR systems are able to capture complex 3D geometries and render virtual representations of captured images. These advances, however, have resulted in significant increases to power consumption, thereby reducing the MR system's battery life. As such, there is an on-going need to increase the MR system's battery life while continuing to provide a high-quality MR experience.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to systems, methods, and devices (e.g., head-mounted devices ("HMD")) that reduce power consumption when performing surface reconstruction. That is, the disclosed embodiments are generally related to 3D imaging systems that use multiple images to generate a stitched/interleaved mesh to generate a 3D representation of the surrounding space and that then use subsequent camera frames to detect changes to this space. As used herein, surface reconstruction generally refers to the process of geometrically modeling an object, multiple objects, or even an entire environment. In addition to MR systems, the disclosed embodiments can be practiced in any type of device that captures three-dimensional representations of a space or even other types of applications separate from MR applications (e.g., architecture, security, etc.).

In some embodiments, multiple depth maps (and depth images used to generate those depth maps) of an environment are obtained. The depth information from these depth maps is then fused/merged together to form a surface mesh of that environment, which comprises a geometric representation or model of discrete interconnected faces (e.g., triangles) and/or other interconnected vertices. The combination of these vertices describes the environment's geometric contours, including the contours of any objects within that environment. Subsequently, instead of obtaining a new depth map and determining whether to update the surface mesh based on that new depth map, a change detection image of the environment is captured. The power consumed when obtaining this change detection image is substantially less than the power consumed when obtaining a new depth map. The change detection image is then compared to the existing surface mesh. When there is a detected difference between the change detection image and the surface mesh that satisfies a pre-determined difference threshold, a new depth map of the environment is obtained. The new depth map is then used to update the surface mesh.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
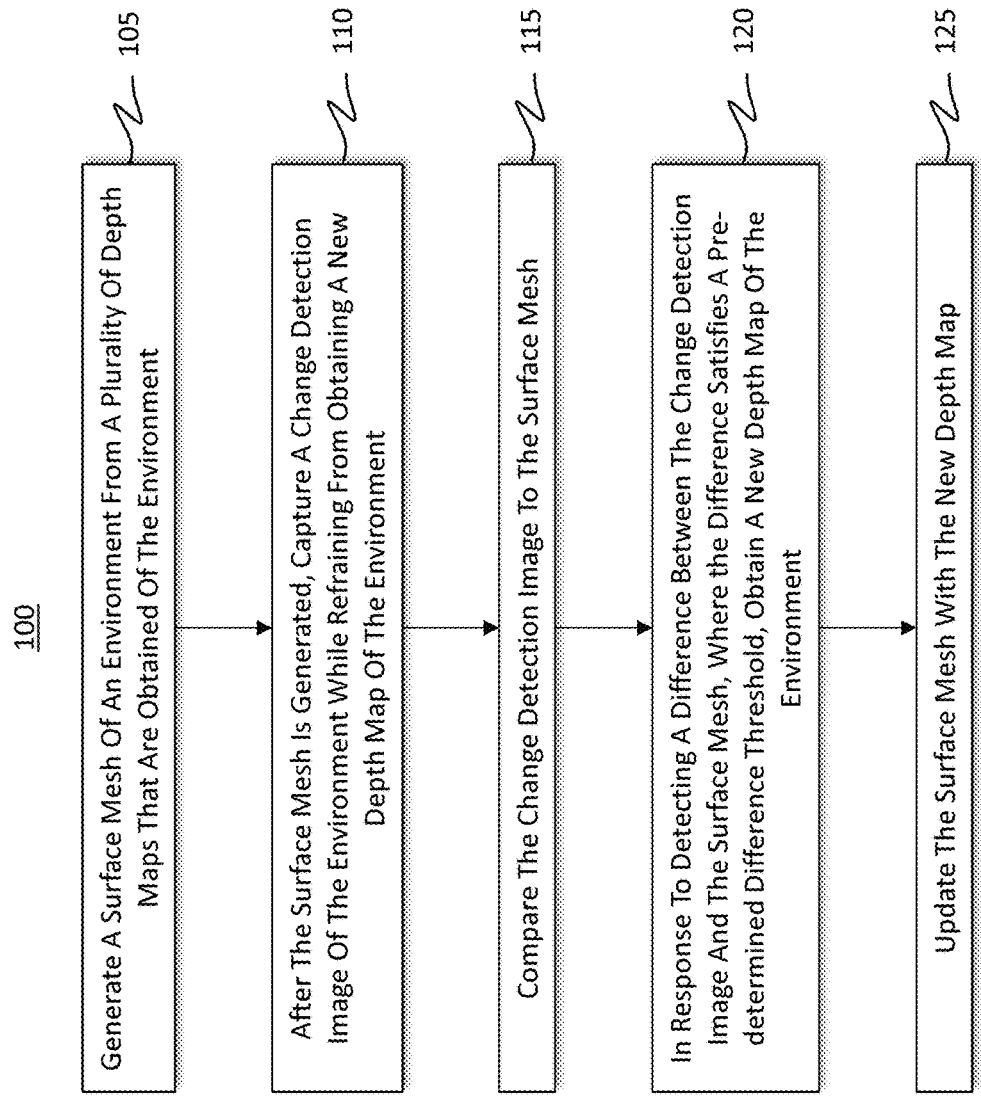
FIGS. 1A and 1B illustrate a flowchart of an example method for reducing power consumption when performing surface reconstruction.

The disclosed embodiments relate to systems, methods and devices, including, but not limited to 3D sensing systems (e.g., time of flight cameras), that reduce power consumption when performing surface reconstruction. As used herein, surface reconstruction generally refers to the process of geometrically modeling an object, multiple objects, or even an entire environment. In addition to MR systems, the disclosed embodiments can be practiced in any type of device that captures three-dimensional representations of a space or even other types of applications separate from MR applications (e.g., architecture, security, etc.).

In some embodiments, a surface mesh of an environment is generated from multiple depth maps obtained from that environment. As used herein, a surface mesh is a geometric representation or model made up of any number of discrete interconnected faces (e.g., triangles) and/or other interconnected vertices. The combination of these vertices defines the environment's geometric contours, including the contours of any objects within that environment. After the surface mesh is generated, a change detection image is captured of the environment while new depth maps of the environment are refrained from being collected. The change detection image is compared to the surface mesh. If a difference is detected between the change detection image and the surface mesh and if that difference satisfies a pre-determined difference threshold, then a new depth map of the environment is obtained. The new depth map is then used to update the surface mesh. If no differences are detected or if the difference threshold is not met, then the embodiments continue to refrain from obtaining a new depth map and instead proceed with obtaining new change detection images, thereby saving power consumption during the scanning and rendering processes.

Technical Benefits

Utilizing the disclosed embodiments, it is possible to significantly reduce how much power is consumed by a depth imaging system (e.g., a time of flight depth system, active or passive stereoscopic camera system, or any other type of depth system that uses active illumination) while performing surface reconstruction, thereby reducing system power consumption and prolonging MR system operational time and also, thereby, improving overall consumer experience and satisfaction.

As described earlier, MR systems project virtual images for a user to view and interact with. Surface reconstruction represents an essential part of MR systems because the resulting surface mesh provides the initial framework for deciding where and how to project virtual images. Unfortunately, surface reconstruction can consume significant amounts of power, resulting in substantial drains to the MR system's battery.

During surface reconstruction, an initial scanning phase is performed by using depth cameras to acquire multiple depth maps (e.g., by obtaining multiple depth images to generate those depth maps) and using these depth maps to generate the initial surface mesh. Although this surface mesh may provide a very robust representation of the environment, surface reconstruction should not subsequently be switched off because most environments are not truly static and the surface mesh will likely need to be updated. Consequently, after the surface mesh is formed, surface reconstruction shifts to a change detection phase. In this phase, new depth maps are less frequently obtained and are used to determine whether the surface mesh should be updated (e.g., as a result of changes to the environment or as a result of new perspectives/viewpoints now being viewable).

As such, most surface reconstruction MR systems still continue to collect depth frames/maps even after the initial surface mesh is formed, on a continuous basis, albeit at a reduced rate. That is, after completing the initial scanning phase, the depth map collection rate is substantially reduced during the change detection phase. As an example, the MR system may transition from collecting "x" frames per second (e.g., 5 fps) during the scanning phase to a lower "y" frames per second (e.g., 1 fps) during the change detection phase. The change detection phase is performed primarily to detect environmental changes and to update the surface mesh based on the identified changes.

It should be noted that most of the depth maps acquired during the change detection phase do not actually improve the quality of the surface mesh because most environments do not change very often or very much. Any capture of a depth map for an unchanged environment represents, in some instances, wasted resources. To understand this, consider the following situation.

At the beginning of a MR session, depth maps are recorded until most of the environment's areas have been recorded at least once. After this initial scanning phase is complete, where the scanning often occurs around 5 fps (but is not required to), there is enough depth information to compute the surface mesh. This scanning phase typically occurs quite quickly (e.g., less than one minute, thereby resulting in around 300 depth frames/maps). The change detection phase, on the other hand, can last as long as the MR session is active. In some cases, the MR session may last multiple hours. If the change detection phase captures depth maps even as little as 1 fps, many thousands of depth maps will be acquired over that time span. Consequently, it turns out that the power consumed for the change detection phase is substantially higher than the power consumed during the initial scanning phase even though the change detection phase provides comparatively less information to the surface mesh. Of course, these numbers are provided for example purposes only and should not be considered binding.

The change detection phase works by comparing the current depth map with the depth information in the existing surface mesh. If a threshold amount of change or discrepancy is detected, then the surface mesh is updated with the information contained in the newly recorded depth map. However, if there is no change, then the new depth map will not provide any meaningful new information to the surface mesh. Thus, the new depth map can be discarded.

As indicated earlier, static non-moving environments are generally far more common than dynamic moving environments. Therefore, because most environments do not change very often, most of the depth frames/maps collected during the change detection phase are actually unnecessary and their collection resulted in substantial amounts of wasted battery consumption. The longer the MR session is, the more egregious the waste is. Consequently, from a power perspective, it would have been better to have not recorded these new depth maps at all. With that understanding, there is a large potential for power saving by improving/optimizing what occurs during the change detection phase. The disclosed embodiments provide optimizations that can significantly reduce power consumption while performing optimized surface reconstruction.

Indeed, significant improvements and technical benefits may be realized by practicing the disclosed embodiments. These improvements include substantially reducing battery consumption, increasing MR environment/scene immersion and timespans, and improving user experiences (e.g., because the user can be immersed in the environment/scene for a longer period of time). It should be noted that the disclosed embodiments do not simply reduce the rate at which depth cameras are used. Rather, the disclosed embodiments additionally, or alternatively, reduce the amount of data that is captured by the depth cameras during the change detection phase and/or reduce the amount of illumination power during the change detection phase in order to achieve these benefits. The disclosed embodiments also operate to extend the longevity of illuminators as a result of those illuminators being used less frequently and/or less intensely. Indeed, traditional illuminators struggle to have a sufficient lifetime for years of continuous operations. The disclosed embodiments, on the other hand, provide substantial benefits because they extend the lifetime of these illuminators.

Example Method(s)

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 1A illustrates a flowchart of an example method 100 for reducing power consumption when performing surface reconstruction, such as, for example, using an HMD that includes one or more depth cameras. As used herein, a "depth camera" includes any type of depth camera. Examples include, but are not limited to, time-of-flight ("TOF") cameras, active stereo camera pairs, passive stereo camera pairs, or any other type of camera capable of detecting or determining depth.

Initially, method 100 includes an act 105 of generating a surface mesh of an environment from a plurality of depth maps that are obtained of the environment. This surface mesh is used to identify the objects within the environment as well as their depth with respect to one another and with respect to the HMD itself.

In an AR environment, the AR system relies on the physical features within the real-world to create virtual images (e.g., holograms). As an example, the AR system can project a dinosaur crashing through the wall of the user's bedroom. To make this virtual image and experience as realistic as possible, the AR system uses the depth and surface characteristics of the wall in order to determine how best to create the virtual image. The surface mesh beneficially provides this valuable information to the AR system.

In a VR environment, the surface mesh provides many benefits because the VR system uses the surface mesh to help the user avoid crashing into real-world objects (e.g., fixed features or furniture) while interacting with the VR environment. Additionally, or alternatively, a surface mesh can be captured to help a user visualize a 3D space. Consequently, it is highly beneficial to construct a surface mesh of an environment, regardless of what type of MR system is in use.

Figure 1B:
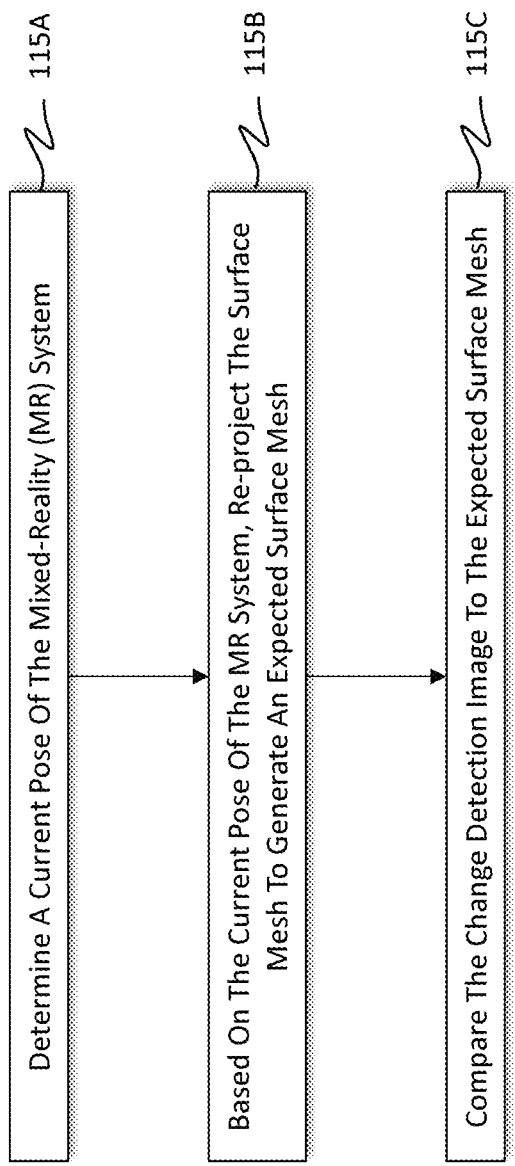
Figure 2A:
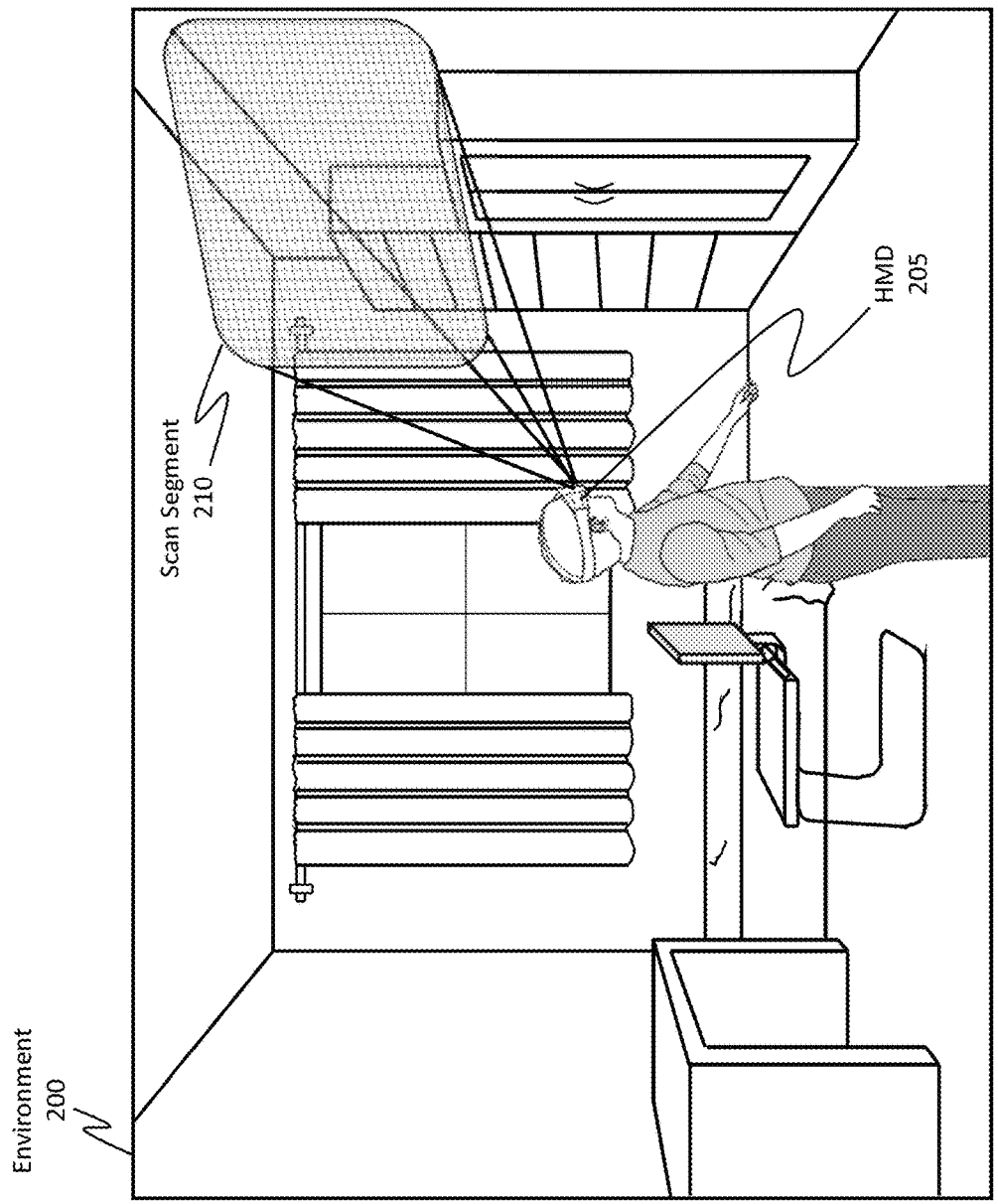
FIGS. 2A through 2G illustrate example techniques for generating a surface mesh of an environment, where the surface mesh is formed by merging/fusing together the depth information from multiple different depth maps taken from multiple different perspectives/viewpoints within the environment.

Turning briefly to FIGS. 2A through 2G, there is shown an example technique for constructing this initial surface mesh, as was described in act 105 of method 100 from FIG. 1. FIG. 2A shows an example environment 200 (e.g., the environment described in act 105). Environment 200 is a bedroom environment that includes a table, a chair, a closet, a bookcase, and a windowpane with drapes. Currently, a user is using HMD 205 to scan environment 200 in order to create a surface mesh for that environment.

During this scanning process, HMD 205 uses its one or more depth cameras to capture multiple depth images of environment 200, as shown by scan segment 210 (i.e. a "depth image") in FIG. 2A. These depth images will be used to generate multiple depth maps of environment 200.

Figure 2B:
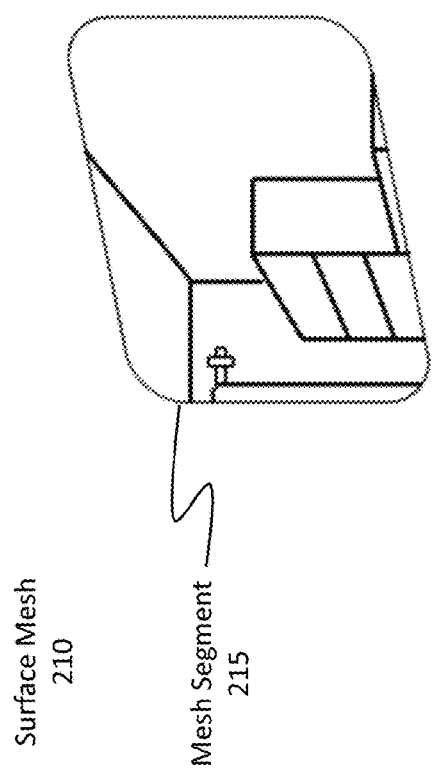

To illustrate, FIG. 2B shows a surface mesh 210 that initially has a mesh segment 215. Mesh segment 215 corresponds to scan segment 210 from FIG. 2A. In this scenario, because only a single scan segment 210 has been obtained, the surface mesh 210 of environment 200 is not yet complete. As the user walks around environment 200 during the initial scanning phase, more pieces of the surface mesh 210 will be created.

Figure 2C:
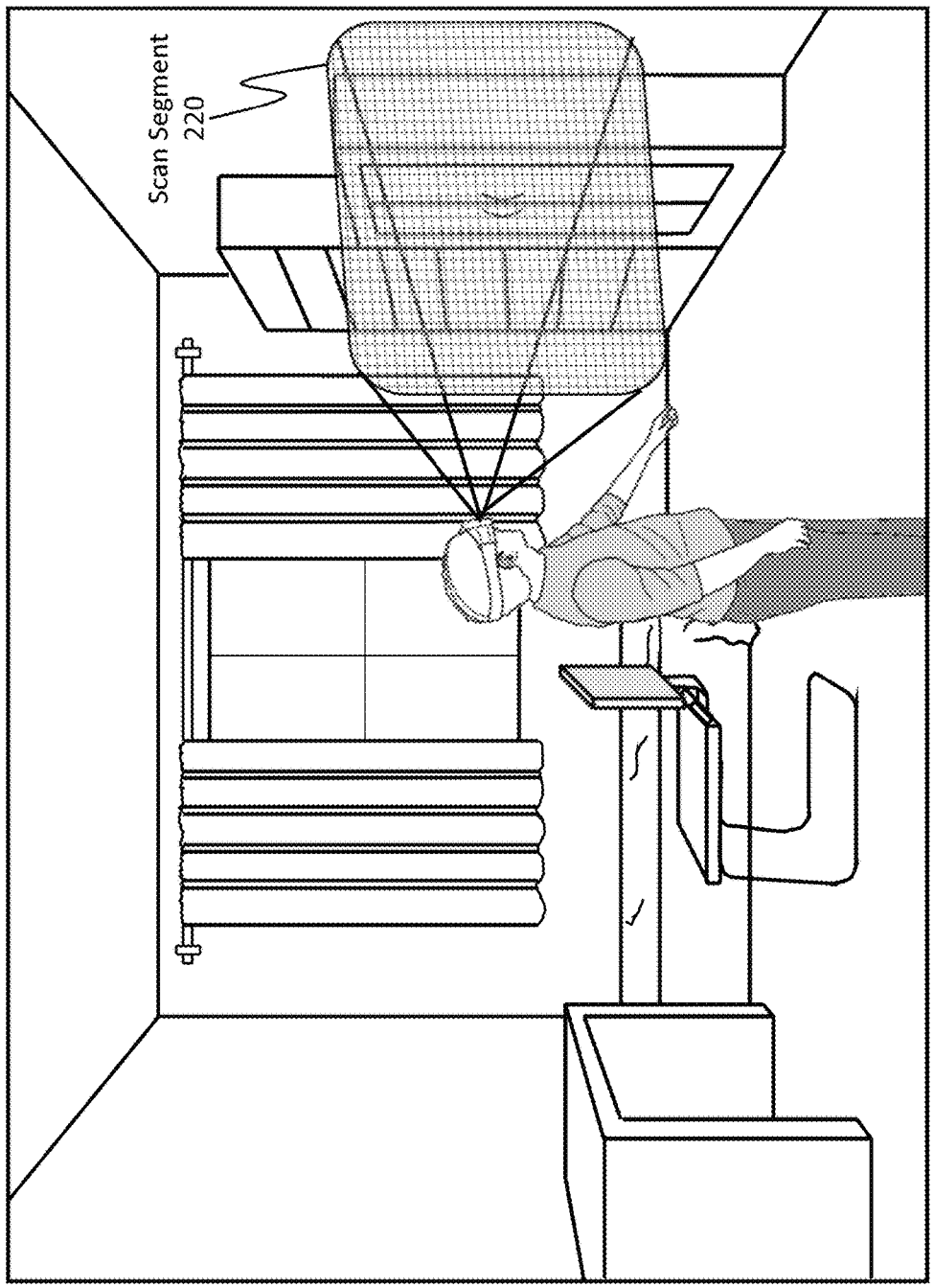
Figure 2D:
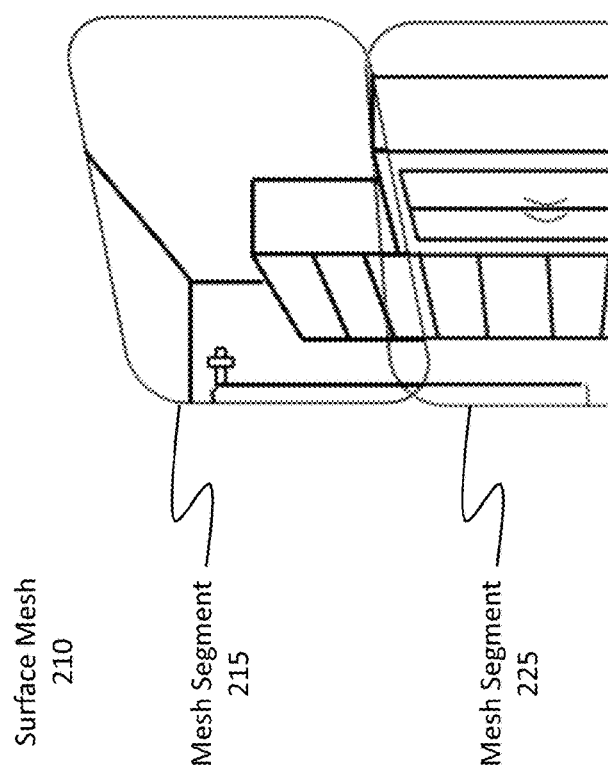

FIG. 2C shows the same environment, but now the HMD is capturing a different viewpoint/perspective of the environment, as shown by scan segment 220. Scan segment 220 is then used to further build the surface mesh 210, as shown in FIG. 2D. More specifically, surface mesh 210 in FIG. 2D now includes mesh segment 225, which was generated based on the information included in scan segment 220, and surface mesh 210 also include mesh segment 215, which was added earlier. In this regard, multiple different depth images were obtained and were used to progressively build surface mesh 210. The information in the depth images is fused together to generate surface mesh 210 and to determine the depths of objects within environment 200.

Figure 2E:
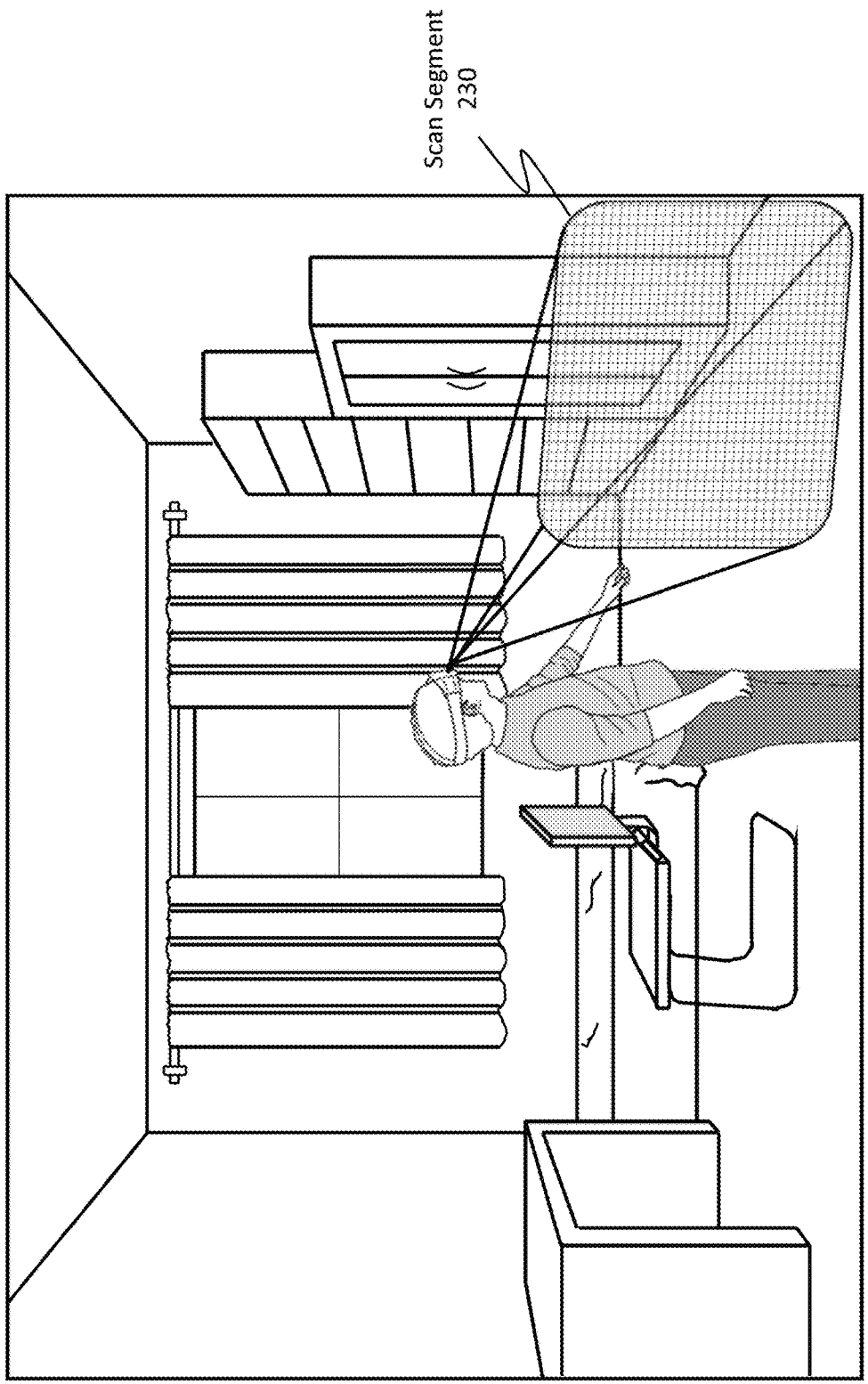
Figure 2F:
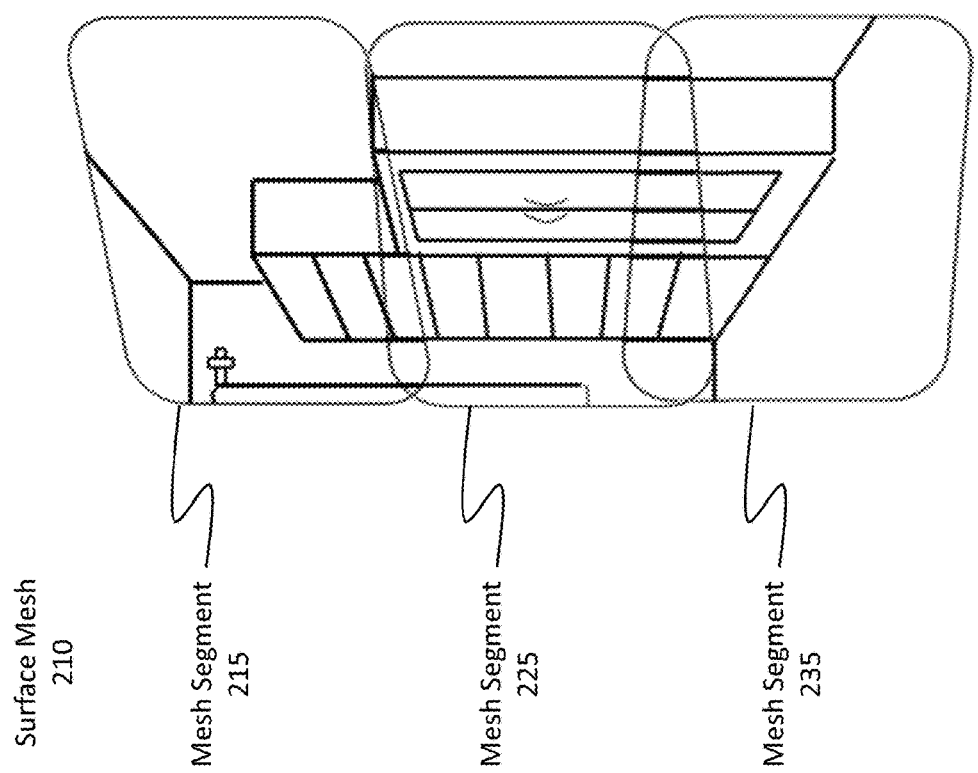
Figure 2G:
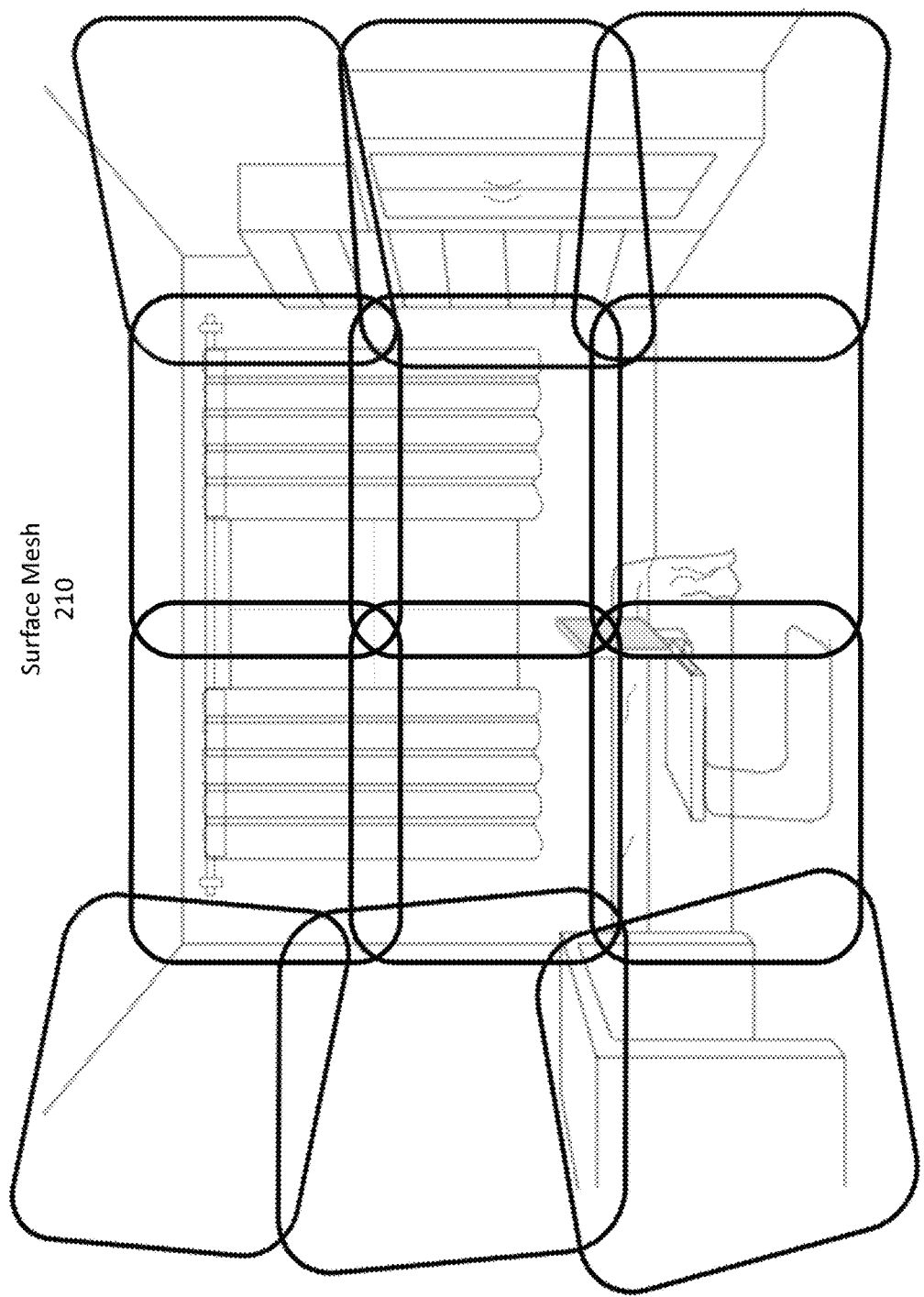

FIG. 2E shows yet another instance in which the HMD obtains a scan segment 230 by capturing depth images of yet another viewpoint of the environment. In FIG. 2F, scan segment 230 is used to generate mesh segment 235, which is added to surface mesh 210. Accordingly, a surface mesh of environment 200 is progressively built by taking multiple depth images of that environment and by fusing the depth information from these images together to create the surface mesh. FIG. 2G shows an example scenario in which the surface mesh 210 is complete because depth images (i.e. scan segments) of most or all of environment 200 have been obtained and pieced/fused together.

To obtain these depth images, the user of the HMD can walk around environment 200 to capture depth images at different locations, perspectives, or viewpoints. This initial calibration, or configuration, is referred to as the scanning phase (discussed earlier) and typically is performed rather quickly depending on the size of the environment (e.g., under a minute). Once the surface mesh 210 is created, it can be stored in a repository for future use or reference. In some cases, the surface mesh is stored in the cloud and made available for the current user/device or potentially for other users/devices. Consequently, some embodiments query the cloud to determine whether a surface mesh is already available for an environment prior to scanning the environment.

Figure 2H:
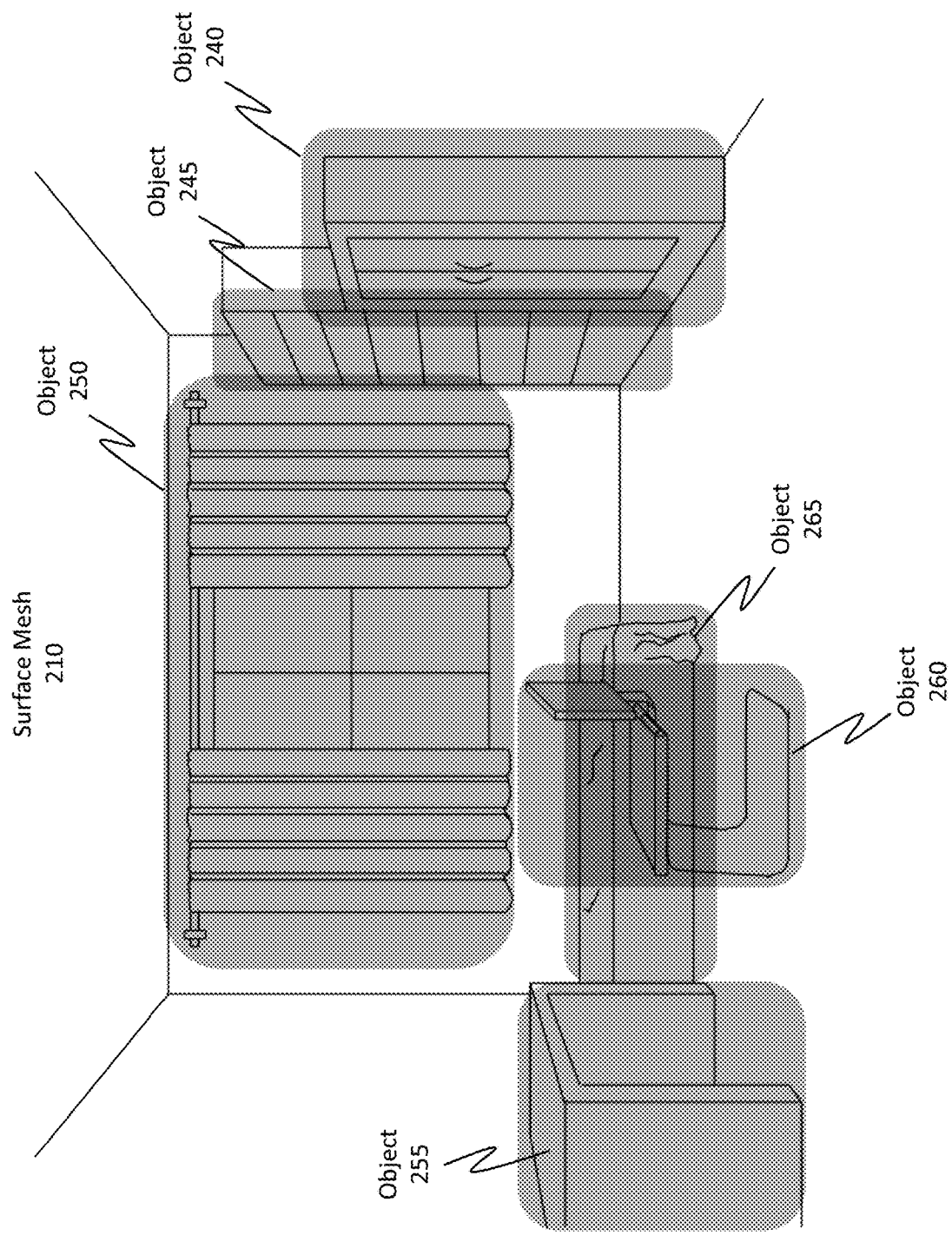
FIG. 2H illustrates how objects within the surface mesh can be segmented or otherwise classified to identify discrete objects and attributes of those objects (e.g., a desk that will likely not move, a moveable chair, a windowpane with drapes that probably will move, etc.).

In addition to acquiring depth data for environment 200, the surface mesh 210 can also be used to segment or classify the objects within environment 200. For instance, FIG. 2H shows a scenario in which the objects captured by surface mesh 210 have been classified, segmented, or otherwise characterized. This segmentation process is performed, at least in part, by determining the attributes of those objects.

To illustrate, surface mesh 210 has segmented object 240 (e.g., the closet), object 245 (e.g., the bookcase), object 250 (e.g., the windowpane with drapes), object 255 (e.g., the desk), object 260 (e.g., the chair), and object 265 (e.g., the bed). Although only six objects are segmented in FIG. 2H, it will be appreciated that any number of objects and object types may be identified. This segmentation process may be performed by any type of object recognition mechanism or even through machine learning.

Based on the identified type or attributes of the objects in the environment, the surface mesh 210 can also assign a context to the environment. As an example, object 260 (i.e. the chair) can be identified as being a moveable chair. Object 255 (i.e. the desk) can be identified as a type of desk that likely will not move. Object 250 (i.e. the window pane and drapes) can be identified as having a high likelihood of moving. Attributes and characteristics of the other objects can be identified as well. These attributes are then used to determine a context for the environment.

This context generally identifies whether the environment is a dynamic environment in which objects are likely to move around or, alternatively whether the environment is a static environment in which objects are not likely to move around. "Context" will be described in more detail later in connection with FIG. 12.

As introduced above, the segmentation process also includes determining how moveable, transitory, dynamic, stable, or static these objects are. For instance, objects 240 (e.g., the closet), 245 (e.g., the bookcase), 255 (e.g., the desk), and 265 (e.g., the bed) are likely to be considered very static objects because there is a high probability that they will not be moved. In this regard, a movement probability can be assigned to each segmented object identified within the surface mesh 210.

As an example, because a bookcase is very heavy, there is a high likelihood that the bookcase (e.g., object 245) will not be moved. In contrast, objects 250 (e.g., the windowpane and drapes) and object 260 (e.g., the chair) may be classified as being highly dynamic, transitory, or moveable. Consequently, these objects may be assigned a high likelihood or probability that they will be moved. The probability metrics may be assigned to objects based on the identified attributes or characteristics of those objects.

Figure 3:
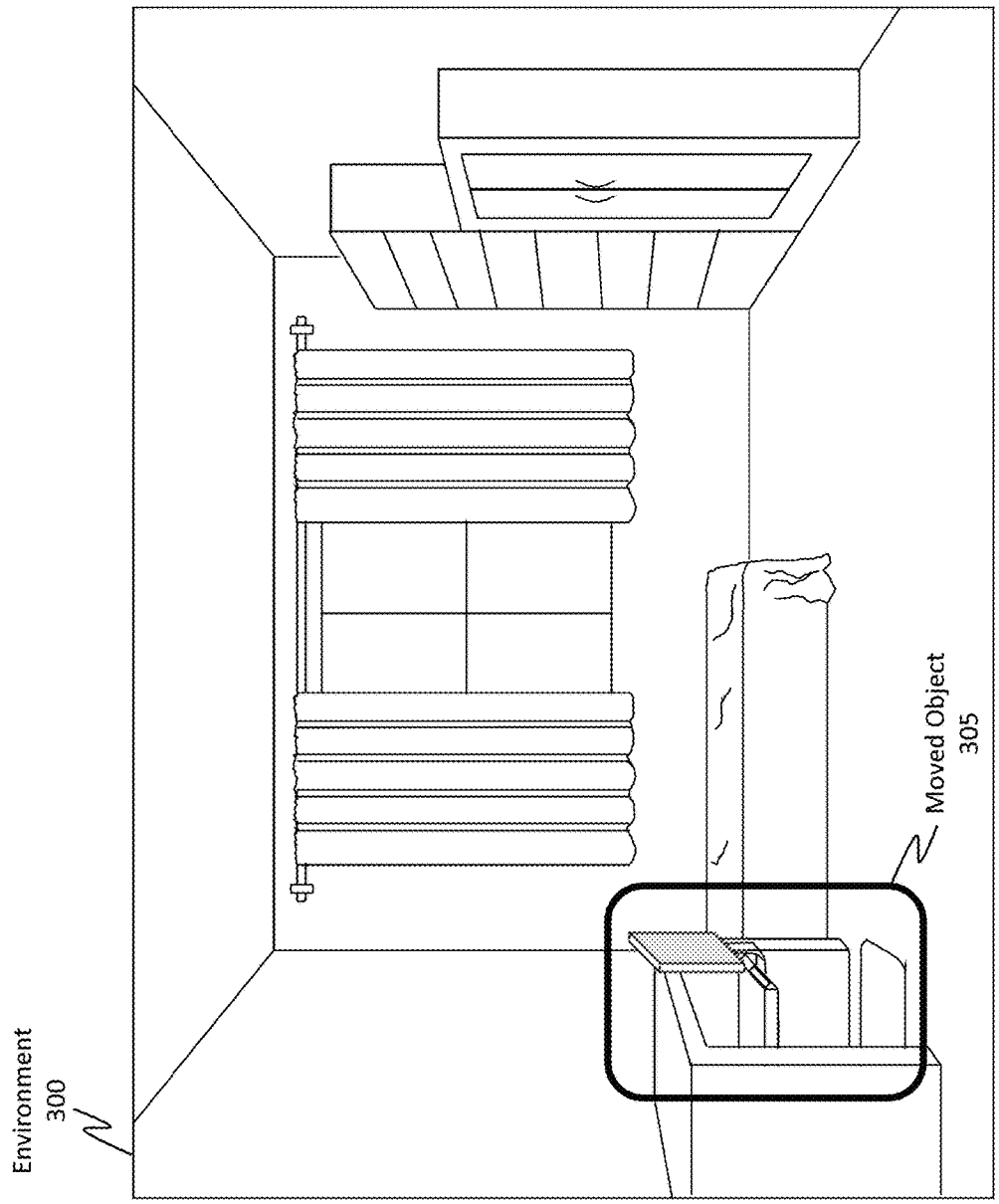
FIG. 3 shows a scenario in which an object (e.g., a chair) in the environment has moved since the last time the surface mesh was updated.

If only the initial surface mesh (e.g., surface mesh 210 as described above) were used, then changes to the environment would not be identified and there is a risk that virtual images would not be projected accurately or even that a user would collide with an object. FIG. 3, for example, shows environment 300, which is representative of environment 200 from the earlier figures. Here, the chair has moved, as shown by moved object 305. If surface mesh 210 were not updated, then virtual images that relied on the placement of the chair within environment 300 would not be projected correctly and the user's experience would likely be diminished.

Figure 4:
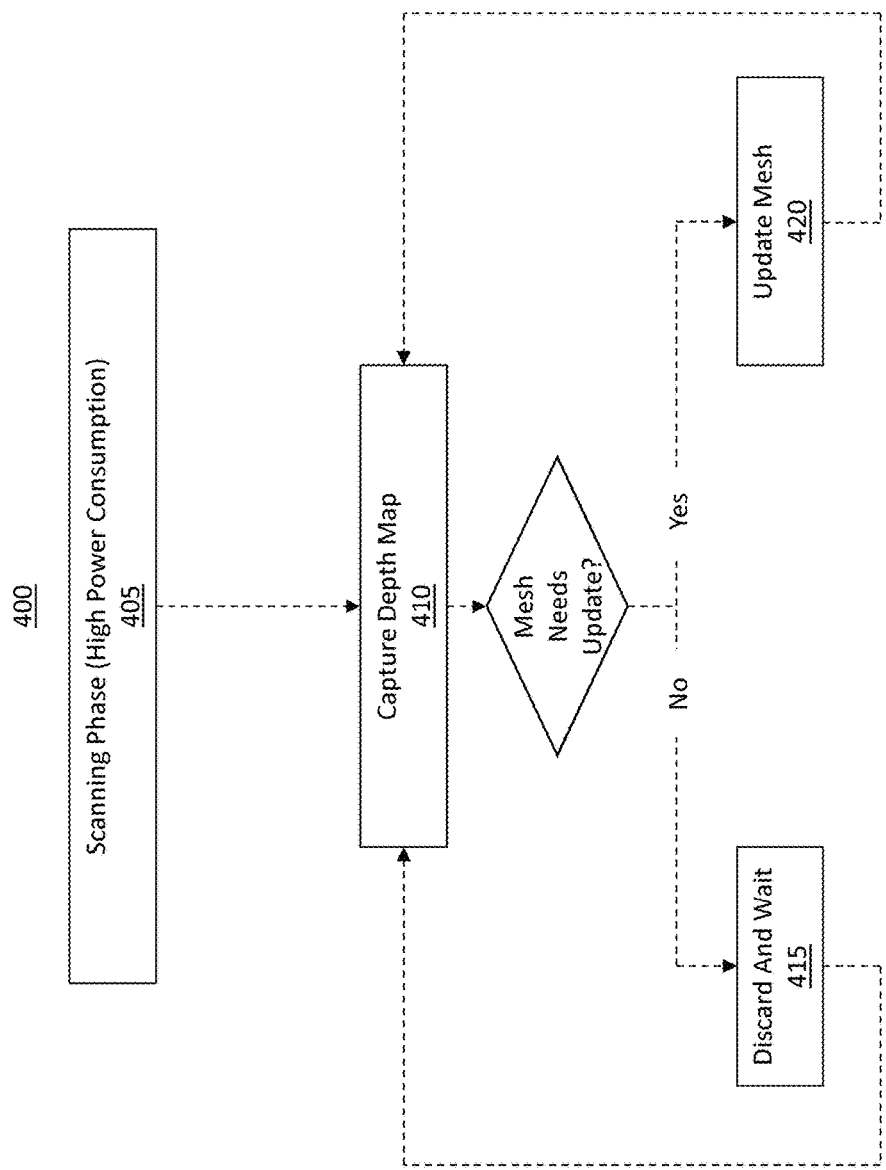
FIG. 4 illustrates one example technique for updating a surface mesh to reflect changes to the environment (e.g., the moved chair).

As described earlier, there are some techniques available to address situations in which objects in an environment move. A flowchart 400 of one example technique is shown in FIG. 4.

Initially, flowchart 400 shows an operation of performing a scanning phase 405, which is representative of act 105 from FIG. 1A as well as the progressive buildup of surface mesh 210 in FIGS. 2A through 2G. Scanning phase 405 is often referred to as a high power consumption phase because this process obtains numerous depth maps, which requires a high amount of power to obtain the depth images and which can be computationally expensive, in order to build the surface mesh.

After the scanning phase 405, surface reconstruction shifts to the change detection phase, as described earlier. That is, at a less frequent periodic basis, depth maps are periodically captured 410 to determine whether the surface mesh is to be updated. When a depth map is obtained, it is compared to the surface mesh to determine whether objects in the environment have moved. If so, then the surface mesh can be updated 420 using the depth map, otherwise the depth map is discarded 415 and surface reconstruction waits until the next depth map capture cycle. While flowchart 400 is one option for detecting changes to the environment, this option is computationally expensive because many depth maps are obtained, as described earlier.

Returning to FIG. 1A, after the surface mesh is generated (act 105), instead of obtaining new depth maps, the disclosed embodiments reduce power consumption by performing an alternative process to determine whether objects in the environment have moved. For example, after the surface mesh is generated in act 105, then a "change detection image" of the environment is captured while the MR system refrains from obtaining a new depth map of the environment (act 110). Examples of change detection images will be provided in more detail later.

This change detection image is then compared to the surface mesh to determine whether any objects in the environment have changed (act 115). This comparison process can be performed in a number of different ways, one of which is shown in FIG. 1B.

Specifically, FIG. 1B shows an act 115A in which a current pose of the MR system (e.g., a HMD) is determined. Then, based on the current pose, the surface mesh is re-projected to generate an expected surface mesh that mimics the pose of the MR system (act 115B). That is, the embodiments re-project the surface mesh to generate expected/anticipated placements and depths of the objects in the environment based on the determined pose of the MR system. Once this expected/anticipated mesh is generated, then the change detection image is compared to the expected surface mesh (act 115C) to detection any changes or discrepancies between the two. If there are no changes or if the changes fail to satisfy a pre-determined difference threshold (described next), then the environment likely did not change enough to warrant spending the computational cost to update the surface mesh. On the other hand, if there are changes that satisfy the pre-determined difference threshold, then the embodiments may update the surface mesh, as described in further detail below.

Returning to FIG. 1A, after the comparison (act 115) and in response to detecting a difference between the change detection image and the surface mesh, where the difference satisfies the pre-determined difference threshold, then a new depth map of the environment is obtained (act 120). That is, if a sufficient difference between the surface mesh and the change detection image is found, which is not very common in most instances, then the embodiments proceed with generating a regular depth frame/map. Therefore, in these situations, the MR system does pay the heightened power costs, and the MR system uses the new depth map to update the surface mesh. But, because this case is relatively uncommon/rare, the MR system is able to drastically reduce the overall amount of consumed power during use and while still maintaining a current and accurate surface mesh of the environment.

When the surface mesh is updated, using the new depth map (act 125), one or more corresponding images associated with the environment, based on the surface mesh, can be rendered on a display for a user.

The disclosed embodiments also address situations in which one or more differences between the change detection image and the surface mesh do not satisfy the pre-determined difference threshold. In such situations, the change detection image is discarded, and the change detection image fails to trigger an update to the surface mesh (i.e. it is refrained from causing an update to the surface mesh). To be more precise, when the change detection image is discarded, no new depth maps are obtained, thus achieving the improved power reductions.

Figure 5:
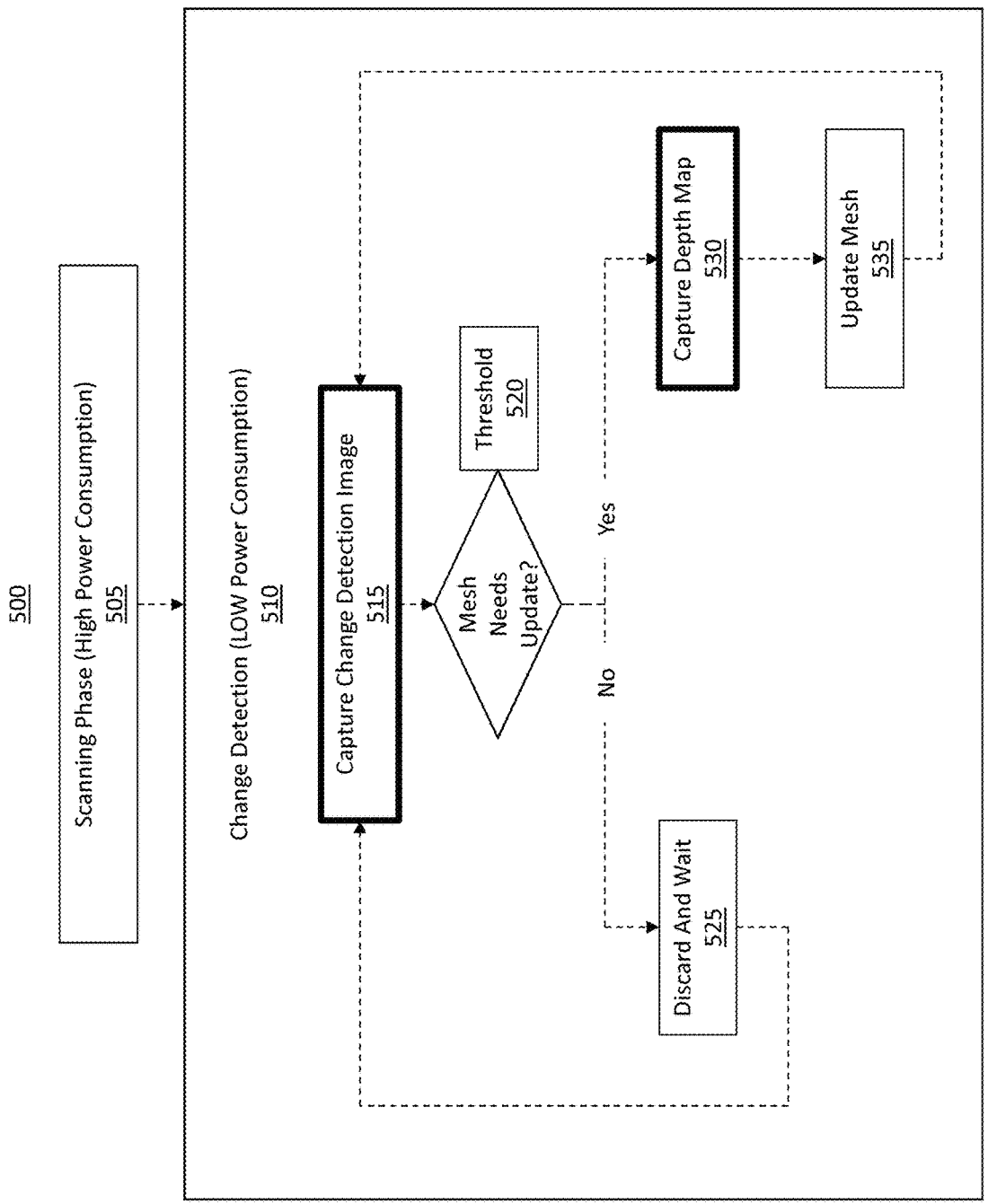
FIG. 5 illustrates an improved technique for updating a surface mesh to reflect changes to the environment, where this improved technique results in substantially less power being consumed.

Another illustration of this process is shown by flowchart 500 of FIG. 5. Similar to flowchart 400 of FIG. 4, flowchart 500 includes the initial scanning phase 505, which is representative of act 105 from FIG. 1 and the processes shown in FIGS. 2A through 2G.

While the initial scanning phases 505 is similar to the initial scanning phase 405, the change detection phase 510 is quite different from flowchart 400's change detection phase. Now, change detection phase 510 is a low power consumption process.

This low power consumption process includes initially capturing 515 a change detection image. This change detection image is compared to the surface mesh to determine whether the surface mesh should be updated. Additionally, or alternatively, the change detection image can be compared to an expected/simulated image based on the 3D mesh. If there are differences between the change detection image and the surface mesh, or between the change detection image and the expected/simulated image, and if those differences satisfy a threshold 520, then flowchart 500 travels the "yes" path and a new depth map is captured 530. Following that process, the surface mesh is updated 535 and the flowchart 500 returns to repeat the cycle. Capturing 530 the new depth map is similar to capturing 410 depth maps in FIG. 4 in that this process generally consumes more power.

On the other hand, if there are no differences between the change detection image and the surface mesh or if those differences fail to satisfy the threshold 520, then the flowchart travels the "no" path and the change detection image is discarded 525. The process then waits until a new cycle is initiated. In this manner, the bolded boxes in FIG. 5 show additional algorithmic steps that are performed as compared to the algorithm described in flowchart 400 of FIG. 4. Although additional steps are performed, these additional steps can help to substantially reduce the MR system's power consumption, as will be described in more detail below.

With specific regard to the threshold 520, it is noted that this threshold 520 may be any predetermined threshold comprising any predetermined percentage and/or magnitude of change of any image attribute, including a pixel location, light intensity, or other attribute used to generate or describe one or more portions of a surface mesh or depth image. Additionally, the terms detected change, or detected difference refers to a detected change that satisfies the threshold 520.

Reducing Power Consumption Using Change Detection Images

Figures 6A, 6B:
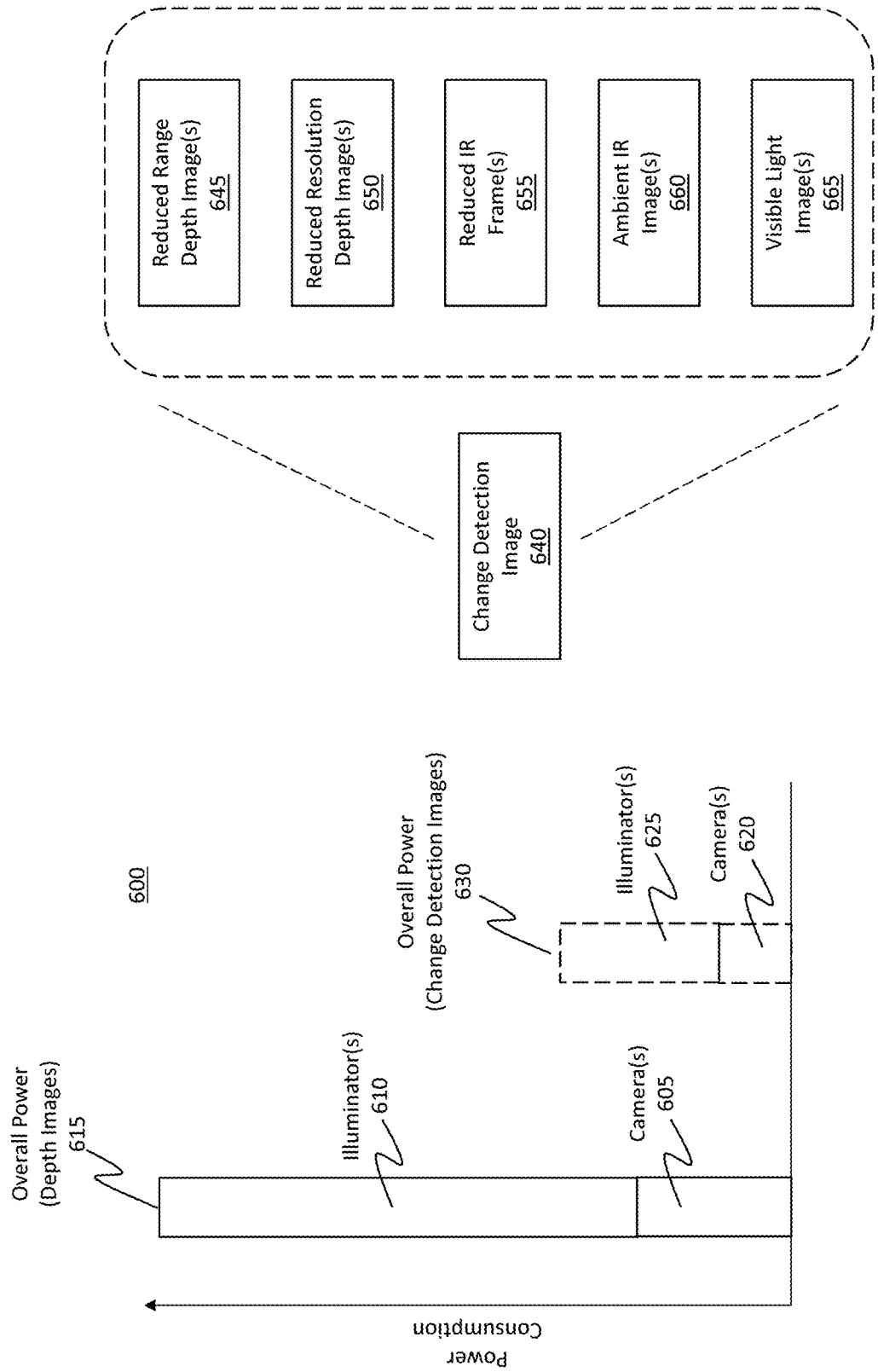
FIGS. 6A and 6B respectively illustrate a graph of power consumption and different example implementations of a change detection image.

FIG. 6A shows a graph 600 illustrating the differences in power consumption as between flowchart 400 of FIG. 4 and flowchart 500 of FIG. 5. As an initial matter, it is noted that there are two main sources of power consumption in the MR system's depth camera module. One source is to run the depth camera's image sensor and the other source is to illuminate the environment with light so the depth camera can adequately identify objects. Typically, the power used to illuminate the environment is substantially higher than the power used for the depth camera sensor.

As shown in FIG. 6A, graph 600 shows an overall power consumption 615 representative of the power consumed when following the steps outlined in flowchart 400. Overall power consumption 615 shows a combined effect of the power consumed by the MR system's depth camera(s) sensor(s) 605 and its illuminator(s) 610.

In contrast, overall power consumption 630 is representative of the power consumed when following the steps outlined in flowchart 500 of FIG. 5 and method 100 of FIG. 1A. Similar to overall power consumption 615, overall power consumption 630 shows a combined effect of the power consumed by the MR system's depth camera(s) sensor(s) 620 and its illuminator(s) 625.

By following the disclosed principles, substantial reductions in power consumption may be achieved, as shown by the differences between overall power consumption 615 (e.g., for depth images) and overall power consumption 630 (e.g., for change detection images). That is, a power consumption amount used when capturing change detection images to determine whether to update the surface mesh is substantially lower than a power consumption amount used when capturing depth images (e.g., used to generate depth maps) to determine whether to update the surface mesh. It should be noted that the relative differences in power consumption illustrated by FIG. 6A are for illustrative purposes only and should not be considered binding or limiting in any manner.

To achieve the power efficiencies, the disclosed embodiments introduce a new step into the algorithm used when updating a surface mesh. That is, the embodiments now rely on the use of a change detection image 640, as shown in FIG. 6B. Change detection image 640 may take on various different forms, as shown.

One form includes a reduced range depth image 645. Another form includes a reduced resolution depth image 650. Another form includes a reduced number of infrared ("IR") frame 655 used to generate a full depth image. Yet another form includes an ambient IR image 660. Another form includes a visible light image 665. Any one or any combination of two or more of these forms may be used to reduce power consumption. That is, one form may be combined with any one or more of the other forms, thereby achieving compounded efficiencies. FIGS. 7 through 11 further expound on each one of these different forms. It should be noted that a change detection image is still a type of depth image that is captured using one or more depth cameras, but a change detection image is a specially created depth image designed to achieve power savings. As such, a change detection image still includes depth information that can be compared against the depth information recorded in the surface mesh. In some scenarios, the change detection image can be a visible light difference image in which differences are identified using visible light.

Reduced Range Depth Images

When illuminators are used to project light (either visible light and/or IR light) into an environment, the illumination power increases with the square of the desired illumination depth range. That is, the power required to illuminate objects 6 meters away is 62 times the power required to illuminate objects 1 meter away. It is possible, therefore, to intelligently reduce the illumination depth range to achieve significant improvements in power consumption. That is, reducing the power consumption of the MR system can be performed by reducing how much illuminated light is projected by the MR system's illuminators.

Figure 7:
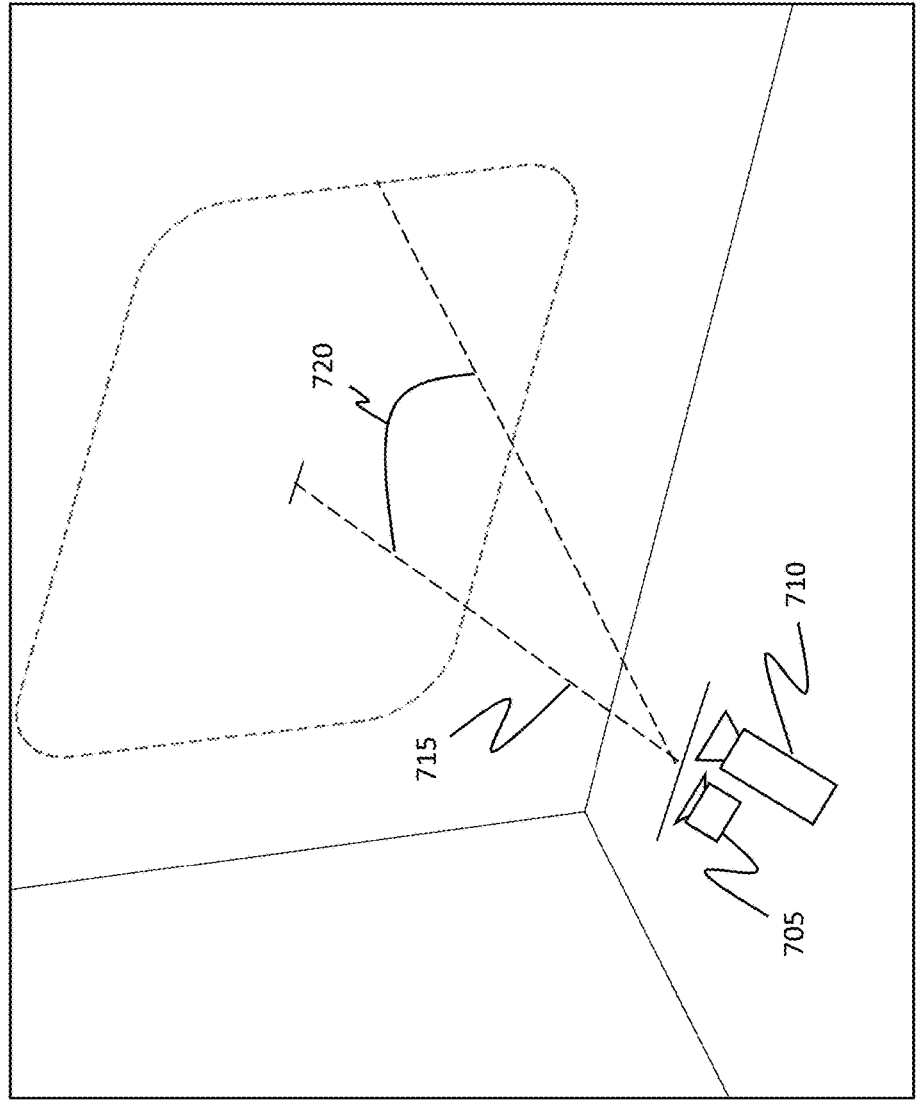
FIG. 7 illustrates a type of change detection image that reduces power consumption by intelligently controlling the illumination range of a depth camera's illuminator.

FIG. 7 shows how a reduced range depth image 700, which is representative of reduced range depth image 645 from FIG. 6B, can be used to reduce power consumption. Here, a depth camera 705 and an illuminator 710 are working in unison with one another. In this example scenario, the illuminator 710 radiates illumination light (either visible light or IR light) onto the wall while depth camera 705 determines the distance 715 between itself and the wall. The illumination light spreads out in both an "x" and a "y" direction, as shown by the illumination field of view angle 720.

It is possible to reduce power by reducing the depth/range the illuminator 710 emits illumination light. Although environmental changes will likely not be detectable beyond this reduced illumination range, the reduced detection is acceptable when compared with the enhanced benefits achieved by reducing battery consumption.

The disclosed embodiments are able to utilize the information already stored in the surface mesh to intelligently determine when to reduce illumination range. For example, in the scenario shown in FIG. 7, the embodiments have used the existing surface mesh and the depth camera 705's pose (e.g., as determined by the MR system's head tracking hardware and components) to determine that the depth camera 705 is currently pointing at a wall. Based on this known information, the embodiments can determine how strong of an illumination beam is needed in order to adequately illuminate the wall without consuming excess power by over-illuminating the wall.

As an example, suppose depth camera 705's maximum depth range is about 6 meters, but the depth camera 705 has determined that it is only about 3 meters away from the wall based on the acquired pose information and the information currently included in the surface mesh (e.g., forms of "feedback" information). If the illuminator 710 is instructed to emit an illumination beam reaching out to only 3 meters (as opposed to 6 meters), then it is possible to reduce power consumption by a factor of 4, as compared to driving/generating a 6-meter illumination beam (e.g., $3^2=9$ vs. $6^2=36$). Accordingly, one type of change detection image is a reduced range image.

An additional technique for reducing power via a reduced range depth image is to reduce the illumination field of view for the illuminator 710. That is, instead of spreading out the illumination beam to cover a broad expanse of area, some embodiments tightly focus the beam so that only a limited area is illuminated. Focusing the illumination can be performed through the use of any type of lens. In embodiments where multiple illumination sources are used, focusing the illumination can be performed by manipulating each of the illumination sources in a manner to focus the illumination. As an example, one illuminator (e.g., a laser) can be used for higher power wide field illuminations and another illuminator can be used for lower power reduced field of illuminations.

By focusing the illumination beam, more illumination light will be directed toward a single location, and far away objects can be illuminated. If it is unnecessary to illuminate those far away objects, then power savings may be realized by reducing the illumination power to illuminate only near objects located within the reduced illumination field of view. Thus, power savings may be realized by controlling the illumination field of view angle 720 shown in FIG. 7. Accordingly, a reduced range depth image can include images whose illumination fields of view are reduced and/or images whose illumination intensities are reduced.

Some embodiments save power by switching to a different type of camera that has a reduced range. For instance, instead of using a surface reconstruction camera having a relatively large range (e.g., 6 meters), images from a head or hand tracking camera can be repurposed and/or reused. Hand tracking, on the other hand, has a relatively smaller range (e.g., around 1 meter) as compared to surface reconstruction cameras. By reusing/re-purposing images obtained from alternative camera systems, additional power savings may be realized. Additionally, or alternatively, one camera lens and sensor can be used in conjunction with multiple illuminators (e.g., lasers) for different depth ranges and fields of illumination. In some embodiments, the color of the surface is taken into account when determining the illumination intensity. For instance, lighter colored surfaces may be easier to illuminate than darker colored surfaces. Similarly, the shape, contour, or angle of the surface can be considered. For instance, a slanted surface may require more illumination than a vertical surface.

Reduced Resolution Depth Images

Figure 8:
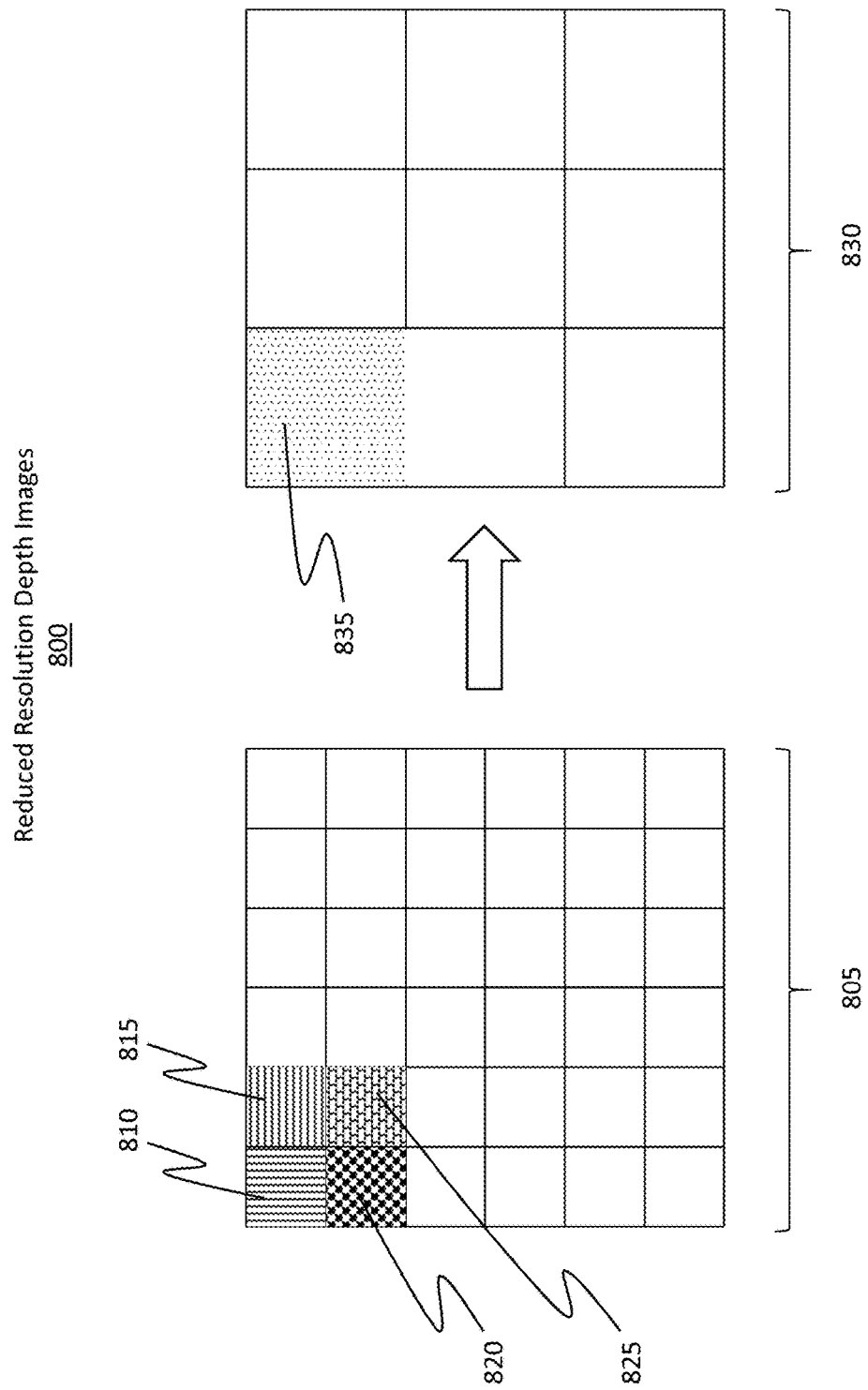
FIG. 8 illustrates a type of change detection image that reduces power consumption by intelligently controlling which pixels are binned/combined using either hardware or software binning.

"Binning" refers to a technique of collapsing a number of pixels together so those pixels operate in unison as a single pixel. FIG. 8 shows an example scenario in which a reduced resolution depth image 800, which is representative of reduced resolution depth image 650 from FIG. 6B, is used as the change detection image. In FIG. 8, there are a set of pixels 805 that includes at least pixel 810, pixel 815, pixel 820, and pixel 825 (more are shown but not labeled). By binning these four pixels together (as well as other pixels), the new set of pixels 830 is formed, where the pixels 810, 815, 820, and 825 were collapsed together to form the single pixel 835.

By performing binning, the embodiments are able to inherently increase the depth range without having to increase the amount of illumination light. Larger pixels are able to capture more light than smaller pixels. Therefore, when the same amount of illumination light is used, a larger pixel, as compared to a smaller pixel, will be able to detect objects further away even though less illumination light reaches those objects. By inherently increasing depth range via binning, the embodiments can then decrease the amount of illumination light so that only nearer objects are illuminated, or rather so that sufficient light is captured in the binned pixels for the depth range of interest, thereby achieving power savings.

As an example, with the set of pixels 805 and with an illumination light value of "x," the set of pixels 805 may be able to detect changes up to 6 meters. In contrast, with the set of pixels 830 and with the same illumination light value of "x," the set of pixels 830 may be able to detect changes up to 10 meters away. Here, the illumination light value "x" can be decreased (resulting in power savings) so that the set of pixels 830 detect changes only up to 6 meters (or any other reduced value).

Accordingly, instead of, or rather in addition to, trading off depth range for power consumption, an alternative tradeoff is to reduce image resolution for a depth image. As a general rule, if a depth image is formed by binning/collapsing pixels (e.g., 2×2 pixels into 1 pixel), it is possible to achieve a power reduction factor of at least 2, while maintaining the same depth range, because of the reductions to the illumination intensity. If increased binning is performed (e.g., 4×4 binning), increased power savings may be realized (e.g., 400% for 4×4 binning).

Any amount of binning may be performed. Some embodiments even bin all of the pixels together to form a single unified pixel. A single pixel may be appropriate for situations in which a single uniform object fills the entirety of the depth camera's field of view. An example scenario includes a situation in which the depth camera is aimed directly at a wall.

As introduced earlier, compound power savings may be realized by combining the power savings effects used from multiple different change detection image forms. For example, if the embodiments reduce the depth range by 50% and apply 4×4 binning, it is possible to reduce illumination power by a factor of 16. Alternatively, one type or combinations of two, three, four, or any number of types of change detection images (as shown in FIG. 6B) may be used.

Another advantage achieved by binning pixels is that of reduced depth noise at the expense of reduced image resolution. When computing the average light measurements over a larger binned pixel, less depth noise will be introduced into the resulting depth image. When there is less depth noise, the depth camera is able to detect further depths/ranges. Thus, binning also brings about an improved depth image.

Reduced Number of Infrared ("IR") Frames

In some cases, to generate a full 3D depth image with a Phase-based Time of Flight depth sensor, nine IR images are used. The first step in extracting a depth map is to measure the phase delay at a single frequency from the depth camera. This is performed by capturing three separate IR images, where there is a 120-degree difference between the illumination waveform and the electronic shutter of the image sensor. These three IR images are then used to estimate the phase between and the object and the sensor. Of course, the numbers recited herein are for example purposes only and should not be considered binding.

The fact that the measurement is based on phase, which wraps around every 2 pi, means that the distance will also have an aliasing distance. Estimating the phase delay at multiple frequencies and by using de-aliasing algorithms, the aliasing distance can be significantly increased, improving camera performance. This technique of measuring phase is then repeated two additional times at different frequencies to provide an accurate true depth estimation without aliasing. Each of these IR images (1) requires the illuminators to illuminate the scene, (2) requires a camera exposure, and (3) requires the image to be read out from the sensor.

Accordingly, when computing depth using IR light, many depth cameras actually capture multiple "phase images" (e.g., typically around nine). Multiple phase images are captured because depth cameras pulse their IR illumination sources (e.g., a laser) at three different IR light modulation frequencies. For each of these three separate modulation frequencies, a depth camera then captures three separate phase images, resulting in nine total phase images. The phase images are then combined using a raw-to-depth algorithm to obtain a single IR depth map.

Figure 9:
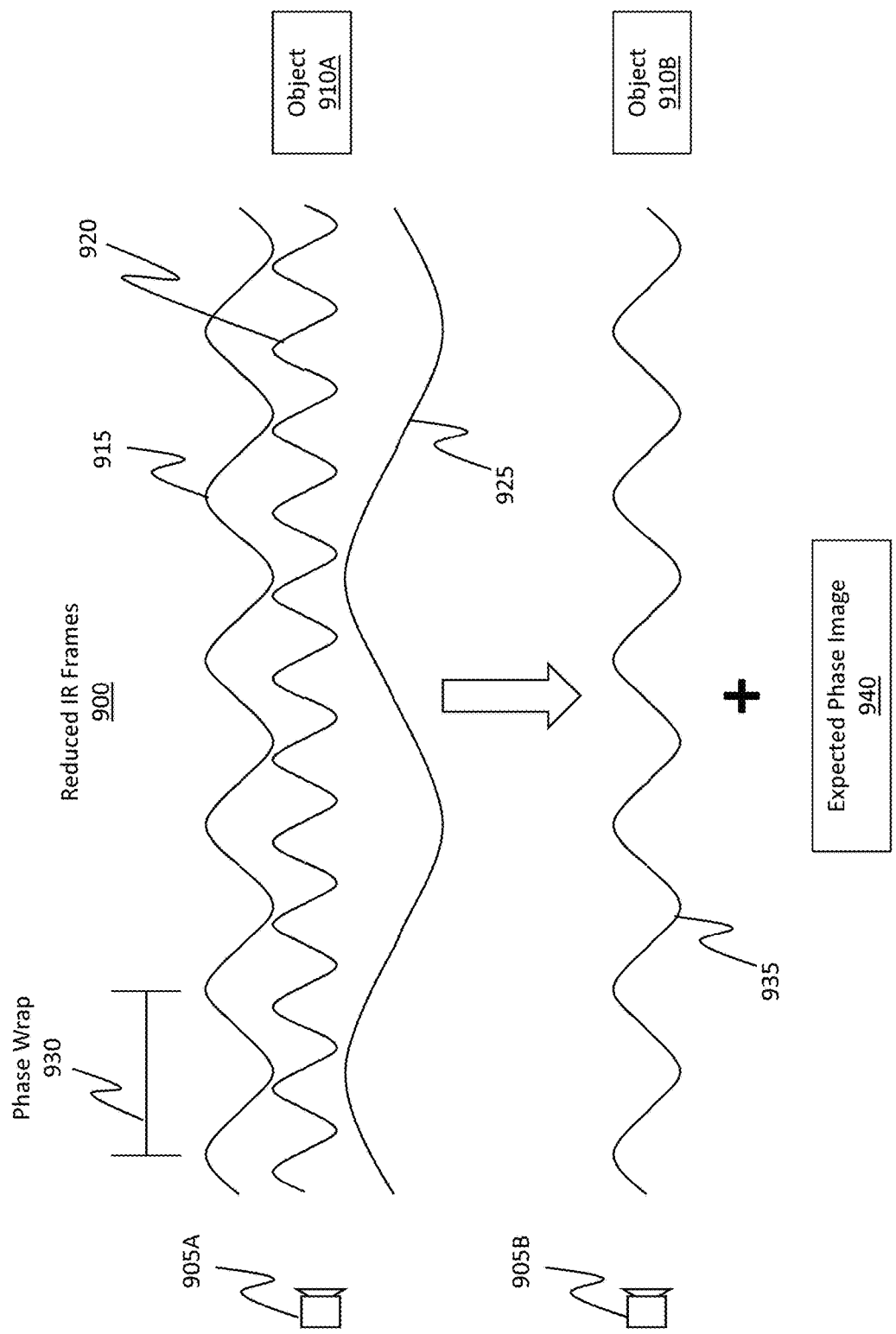
FIG. 9 illustrates a type of change detection image that reduces power consumption by reducing how many infrared ("IR") depth images are captured when determining depth.

FIG. 9 shows an example depth camera 905A that uses a reduced IR frame 900, which is representative of reduced IR frame 655 from FIG. 6B. Depth camera 905A is capturing IR phase images of an object 910A. In this scenario, there are three separate IR modulation frequency illumination measurements (e.g., IR light 915, IR light 920, and IR light 925) being projected towards the object 910A by an IR light illumination source (not shown). As shown by the different wave patterns, each of these different IR light waves has a different modulation frequency. Two of them have higher modulation frequencies (e.g., typically around 150-200 MHz) while the third has a lower modulation frequency (e.g., typically around 5-20 MHz). By capturing three phase images for each of the three separate modulation frequencies (resulting in nine total images), depth camera 905A will be able to accurately determine the distance between itself and the object 910A.

The reason why many IR depth cameras use three different IR modulation frequencies is to resolve what is referred to as "depth aliasing ambiguities." To be more precise, depth aliasing ambiguities occur as a result of the IR depth camera not being able to accurately determine how many "phase wraps" are between itself and the target object when only a single IR light modulation frequency is used to illuminate the target object. An example of a phase wrap 930 is shown in FIG. 9. Here, if only a single IR modulation frequency were used, depth camera 905A would not be able to accurately determine whether object 910A was one phase wrap away, two phase wraps away, three phase wraps away, and so on. As an example, if the modulation frequency of IR light 915 phase wraps at a distance of 1 meter, depth camera 905A would not be able to distinguish the difference between the cyclic depths of 500 mm, 1500 mm, 2500 mm, and so on, thus resulting in a depth aliasing ambiguity when only one IR light modulation frequency illuminates object 910A.

By projecting an increased number (e.g., 3) separate IR modulation frequencies towards object 910A, any depth aliasing ambiguities can be resolved because depth camera 905A can determine and then compare the number of phase wraps for each of the three separate IR modulation frequencies. To illustrate, object 910A is approximately 6 phase wraps away with reference to IR light 915, it is approximately 12 phase wraps away with reference to IR light 920, and it is approximately 2 phase wraps away with reference to IR light 925. Combinations of lower and higher modulation frequency emissions resolve the aliasing issue (i.e. how many phase wraps away is the target object) while the higher modulation frequency emissions help improve depth accuracy, resulting in a higher fidelity measurement. As such, multiple IR modulation frequency emissions help facilitate accurate depth determinations. In some cases, determining how many phase images to capture is dependent on the type of object being monitored. For instance, near an object's edges, the depth determination will likely be less certain. Consequently, the embodiments can determine whether additional depth monitoring is required for contours or edges. In this regard, the quality expectation or threshold for depth monitoring can be different depending on the characteristics of the objects being monitored, such as, for example, whether an edge or contour is being recorded.

In contrast to generating nine separate phase images, the disclosed embodiments can reduce power consumption by refraining from recording the whole set of nine input phase images. For example, in one implementation, the embodiments rely on only a single modulation frequency (out of the three) and record only the three phase images for that one modulation frequency.

For instance, FIG. 9 shows a depth camera 905B recording depth values for an object 910B. Here, only a single IR modulation frequency light wave (e.g., IR light 935) is being projected towards object 910B. By recording three phase images for this one IR modulation frequency light wave (i.e. IR light 935), the embodiments can then generate a single compiled phase image that represents a precursor to depth. With the reduction in the number of phase images, however, the above-described depth aliasing ambiguity will occur. The disclosed embodiments are able to address this ambiguity by generating what is referred to as an "expected phase image" using the surface mesh.

For example, knowing the IR illumination modulation frequency, it is possible to compute an expected phase image 940 using the surface mesh. Expected phase image 940 is generated by re-projecting the surface mesh to correspond to the MR system's current pose (e.g., as determined by the MR system's head tracking hardware and components), thus producing the expected phase image 940. Generally, if the environment has not changed, then expected phase image 940 should coincide with the single IR modulation frequency compiled phase image described above.

Once the expected phase image 940 is generated, then the expected phase image 940 can be compared against the single IR modulation frequency compiled phase image to identify any differences between the two images that satisfy a difference or detection threshold. If there are differences, then those differences suggest that the environment did change. If there are no differences, or if the differences are minor (e.g., they fail to satisfy a pre-determined difference threshold), then the environment likely did not change in a meaningful manner that warrants updating the surface mesh with new depth images.

Accordingly, depth aliasing ambiguities can be resolved by computing, or rather re-projecting, the surface mesh into the MR system's current pose and using that re-projected mesh during the comparative analysis with the single IR modulation frequency compiled phase image. It is noted that performing the re-projection process consumes substantially less power than illuminating an environment with IR light and capturing an image of that environment. As such, the power consumption for the re-projection is trivial when compared to the power consumption used to generate any one of the phase images.

Some embodiments expand on the above concept even further. For instance, it is possible to further reduce the number of raw phase images from three (as described in the improved processes above) to only one or even two. This reduction occurs by capturing only one phase image of only a single IR modulation frequency. With capturing only one phase image, a different phase wrapping calculation is performed. That is, instead of a phase wrap of pi, the phase wrap is cosine of (pi+delta) (i.e. cos(pi+delta)) where delta is some globally chosen offset. This means that the ability to detect changes is somewhat reduced because, besides the phase wrap, there is now an additional two-fold ambiguity that is not unique (e.g., a reduced precision around the phase delta and an inability to differentiate between a zero cosine and being out of depth range or too dark). This also means that it may be beneficial to alternate between phase offsets when doing periodic change detection image captures.

With reference to FIG. 9, instead of capturing three phase images using IR light 935, only a single-phase image is captured using IR light 935. Similar to before, the embodiments compute an "expected phase image" from the surface mesh based on the MR system's current pose. Here, however, the surface mesh is re-projected and the expected phase image is computed in a manner as if only a single-phase image (as opposed to three phase images) was captured (i.e. the surface mesh is re-projected to mimic a single-phase image). Then, this single-phase image is compared to the expected phase image to detect any changes. Consequently, some embodiments can reduce power consumption by a factor of three (e.g., going from 9 phase images to 3 phase images) to measure the phase between the camera and the object while other embodiments can reduce power consumption by a factor of nine (e.g., going from 9 phase images where three phase delays and the depth is measured to only a single IR image at a single delay between the IR illuminators and the shutter).

It should be noted that any of the three IR modulation frequencies can be used for the reduced IR frame 900 described in connection with FIG. 9. Accordingly, when the change detection image is implemented as the reduced IR frame 900, then a depth map can be computed using a smaller/reduced number of raw input IR images than the number that was used for a regular IR depth map.

Ambient IR Light Images

Figure 10:
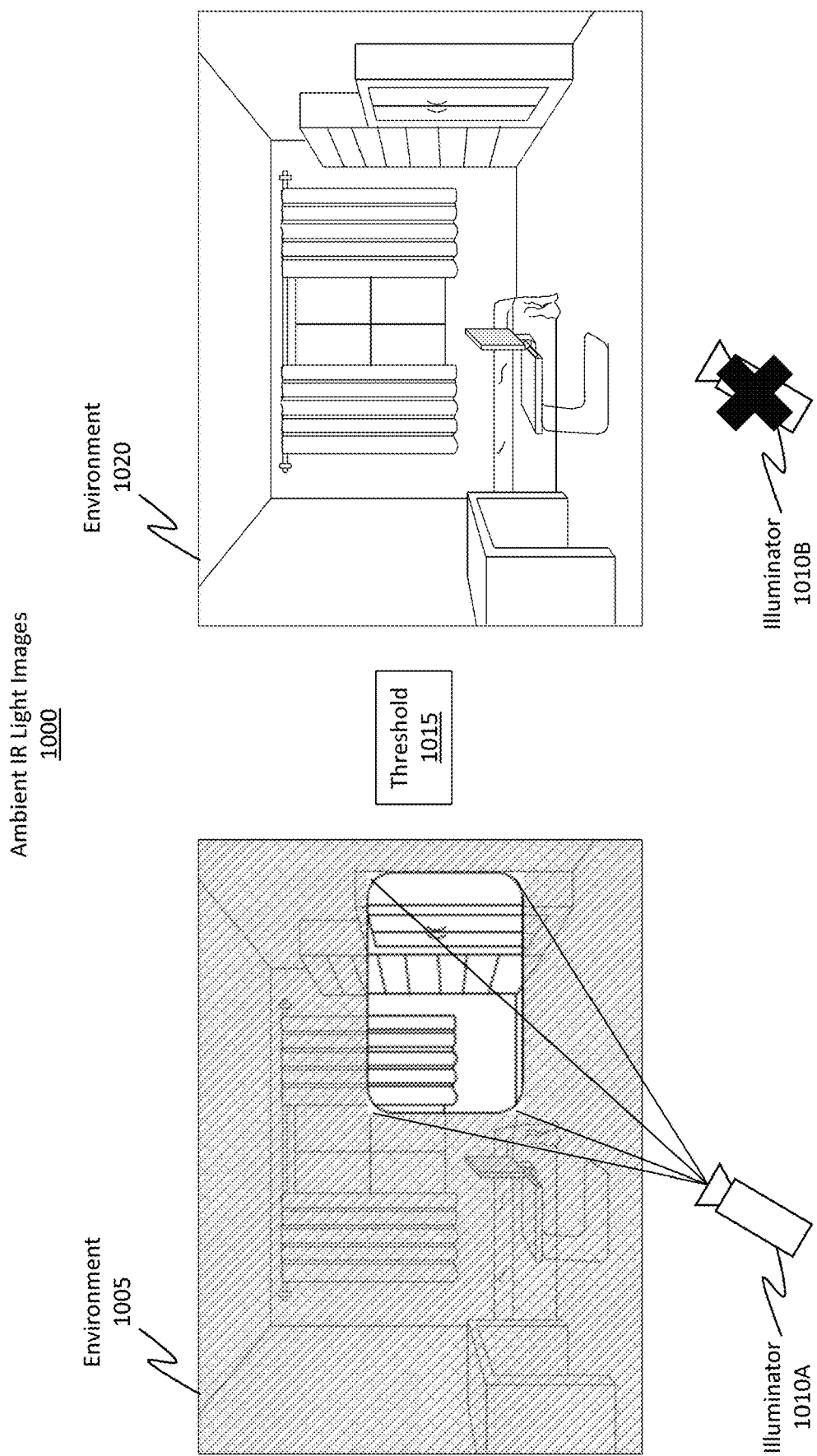
FIG. 10 illustrates a type of change detection image that actively refrains from using an IR light illumination source when ambient IR light levels satisfy a pre-determined threshold.

FIG. 10 shows a scenario in which an ambient IR light image 1000, which is representative of the ambient IR image 660 from FIG. 6B, is used as the change detection image. First, there is shown an environment 1005 in which the amount of ambient IR light is relatively low, as shown by the dark shading in environment 1005. That is, the amount of ambient IR light in environment 1005 is below a threshold 1015 amount of ambient IR light. The MR system's depth camera is able to detect ambient light levels by computing the average light intensity across its depth camera's sensors. The threshold 1015 can be set to any threshold ambient light value, which can then be compared to the detected average value. Because the threshold 1015 is not satisfied, an illuminator 1010A is used to project IR illumination light into environment 1005 so a depth camera can detect changes.

On the other hand, environment 1020 shows a scenario in which the amount of ambient IR light in environment 1020 is above the threshold 1015. In this case, the embodiments can actively prevent/refrain the illuminator 1010B from projecting IR illumination light.

Accordingly, if there is enough ambient illumination in the IR spectrum, it is possible to completely avoid the costs of actively illuminating the environment. Instead, the depth camera can be used as a regular IR camera without additional illumination.

Some embodiments detect change by storing the observed IR intensity as additional information in the surface mesh. If there is considerable discrepancy between the IR values recorded in the surface mesh and the corresponding IR values of the ambient depth image, the embodiments can then trigger an update for the surface mesh by capturing a new depth map.

In some embodiments, data in the form of multiple voxels is used, where each voxel defines as a three-dimensional space. Similar to how a pixel defines an area for a two-dimensional plane, a voxel can be used to define a volume for a three-dimensional space. For every voxel, it is possible to compute an "expected" light intensity or brightness value based on the depth camera's current pose by re-projecting the stored intensity values into the depth camera's current pose. Once the expected values are generated, they can be compared against the actual values to identify any discrepancies. In this manner, the embodiments can store color and/or light intensity values for every voxel. In some embodiments, the intensity from different angles is different, so it is also possible to compute light sources and points where light comes from and perform estimations as to how the light reflects from every direction. Voxels can be created during the depth map fusion stage and the surface mesh can be extracted from the voxels. After the surface mesh is extracted, the color stored in the voxels can be remapped onto the surface mesh's triangles. Thereafter, it is possible to estimate the expected intensity image for any given camera viewpoint.

As introduced earlier, in some embodiments, threshold 1015 is based on the average brightness for the depth camera's pixels. As an example, with an 8-bit image, the maximum brightness would be 255. The embodiments can set the threshold 1015 to be any value such as, for example, 30. If the average brightness across all of the pixels computes to a value at or above 30, then it may be determined that there is a sufficient amount of IR ambient light. Consequently, the illuminator 1010B need not be turned on. Of course, any value for threshold 1015 may be used and is not limited to the values recited herein. In this regard, the change detection image may be an ambient IR image 1000 that was captured while the MR system refrained from illuminating the environment with IR spectrum illumination light.

Ambient Visible Light Images

Figure 11:
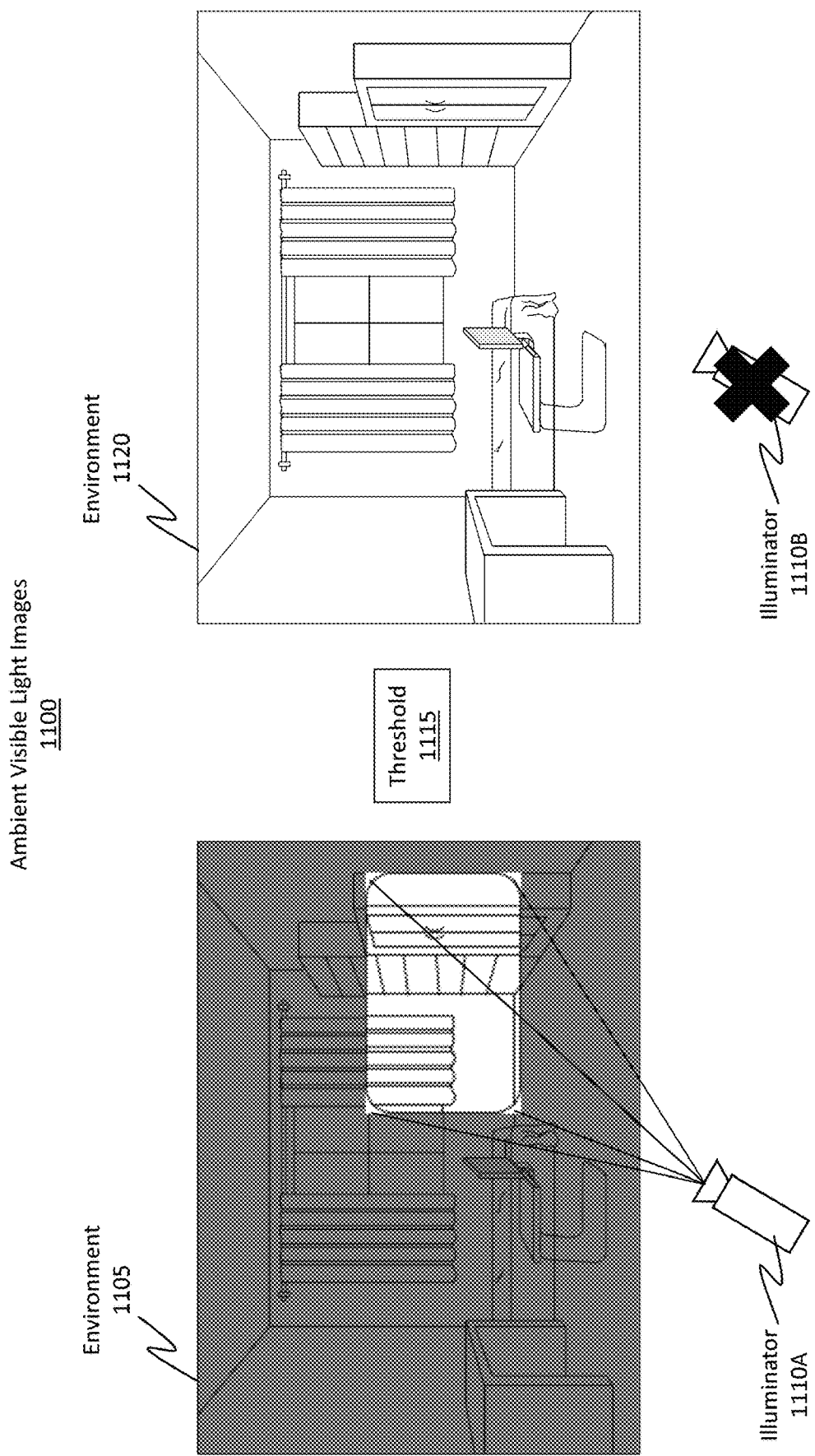
FIG. 11 illustrates a type of change detection image that actively refrains from using a visible light illumination source when ambient visible light levels satisfy a pre-determined threshold.

FIG. 11 shows a similar situation to that of FIG. 10, but FIG. 11 relies on an ambient visible light image 1100, which is representative of the visible light image 665 from FIG. 6B. Here, there is an environment 1105 in which the amount of ambient visible light is relatively low, as shown by the dark shading in environment 1105. That is, the amount of ambient visible light in environment 1105 is below a threshold 1115 amount of ambient visible light. Threshold 1115 may be determined in the same manner as threshold 1015 from FIG. 10 but for the visible light spectrum as opposed to the IR light spectrum. Because threshold 1115 is not satisfied in environment 1105, an illuminator 1110A is used to project visible illumination light into environment 1105 so a depth camera can detect changes in that environment.

On the other hand, environment 1120 shows a scenario in which the amount of ambient visible light in environment 1120 is above the threshold 1115. In this case, the embodiments can actively prevent/refrain the illuminator 1110B from projecting visible illumination light, thereby achieving power savings. Consequently, a change detection image can rely on the average amount of ambient light (either visible light or IR light) to determine when to project illumination light into an environment. By performing this determination, power savings may be realized because not every environment will require the additional illumination light. In some embodiments, the HMD does not project visible light. Therefore, the change detection image can be captured using VLC images by mapping VLC data onto the surface mesh, re-projecting the colored mesh onto the VLC camera image, and then comparing the expected image to the actual image. If no change is detected, no depth image is captured. In this manner, it is possible to save power by preventing IR illumination (not visible light illumination).

In some embodiments, instead of acquiring an entirely new image for the change detection image, a separate image, such as one used for head or hand tracking, are re-purposed to act as the change detection image. Consequently, reductions in both illumination power and camera power can be achieved. Additionally, similar to the recorded IR light intensity values, it is possible to store visible light intensities in the surface mesh to determine when changes have occurred in the environment. In this regard, the change detection image may be a visible light image that was captured while the MR system refrained from illuminating the environment with visible spectrum illumination light.

Adjusting Capture Frequencies

Figure 12:
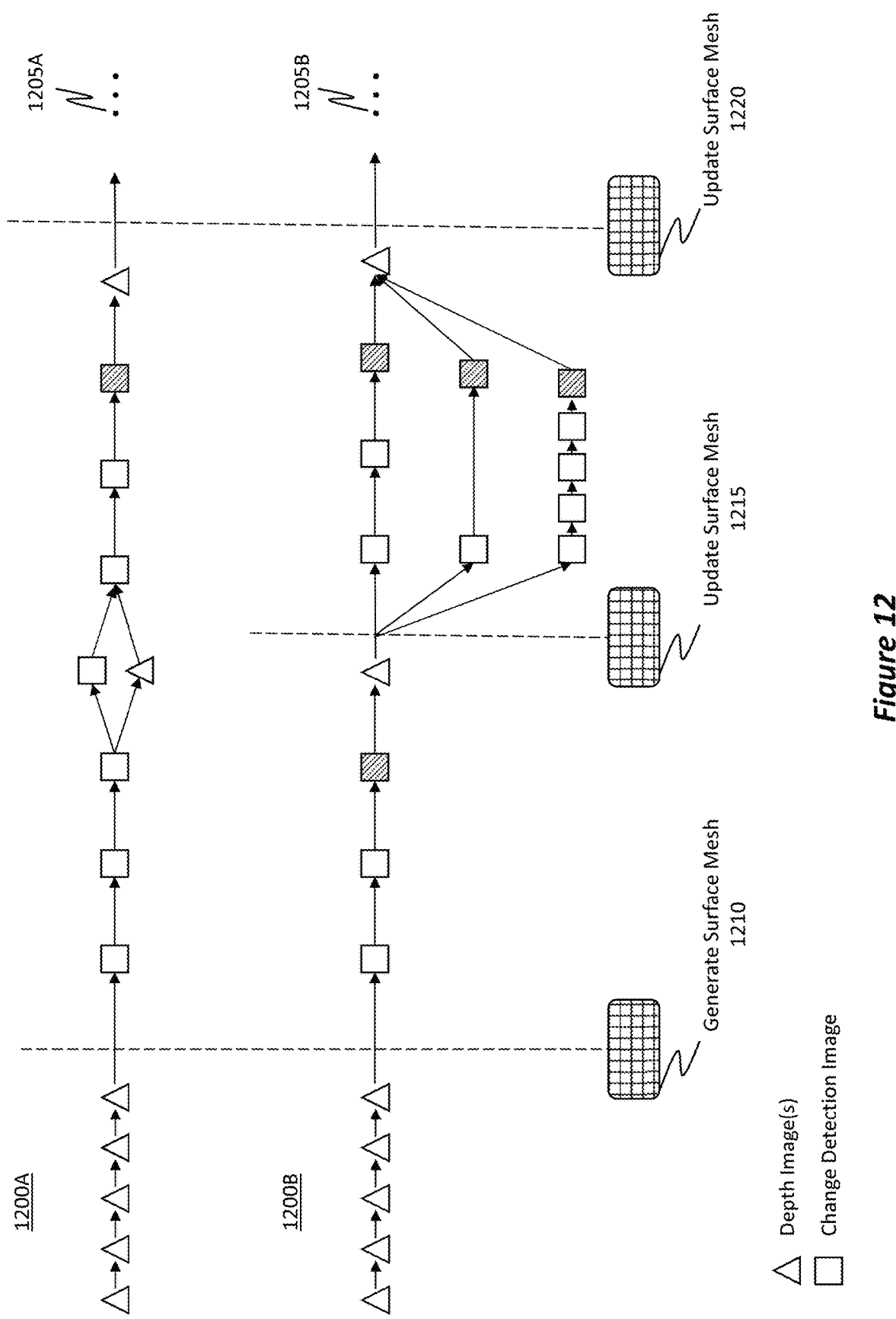
FIG. 12 illustrates some example sequences used to determine when to capture change detection images.

FIG. 12 shows two example sequences 1200A and 1200B illustrating how depth images (e.g., triangles) and change detection images (e.g., squares) can be acquired. In the first sequence 1200A, an initial set of depth images are captured during the initial scanning phase to generate a surface mesh 1210.

In some embodiments, the depth images captured during the initial scanning phase are captured at a first frame per second rate, such as, for example, anywhere between 1-10 frames per second. To clarify, in order to generate the surface mesh 1210 in a fast manner, some embodiments perform the scanning process using high frame rate captures. As such, the surface mesh 1210 can be quickly built by fusing together the information from the different depth images. This increased/high frame rate is shown by the close proximity between the initial triangles in sequence 1200A.

Following the initial scanning phase and the generation of the surface mesh 1210, sequence 1200A begins to capture change detection images (e.g., the squares). In some embodiments, capturing the change detection images of the environment is performed at a second frame rate per second, such as, but not limited to, anywhere between 0.5 frames per second and 5 frames per second. The second frame per second rate is lower than the first frame per second rate. Of course, the second frame per second rate may be set to other values such as, but not limited to 0.1, 0.2, 0.3, 0.4, 0.5, 0.6, 0.7, 0.8, 0.9, 1, 2, 3, 4, 5, 6, 7, 8, 9, 10, 11, 12, or even more frames per second.

In some embodiments, as described above, the system refrains from obtaining new depth images (after the initial surface mesh is generated) and only obtains change detection images until a change in the environment is identified that satisfies a difference/detection threshold. The hashed squares in FIG. 12 symbolically represent a scenario in which a change in the environment is detected by comparing the change detection image to the surface mesh. After such a change is detected (which satisfies the threshold), sequence 1200A causes a regular depth image (i.e. the triangle) to be obtained. Then, the surface mesh is updated 1220. The ellipses 1205A symbolically represent that this process may continue until the MR session is complete.

Whereas some embodiments rely exclusively on the change detection images, other embodiments will periodically interleave sequence 1200A with regular depth images. For instance, the triangle in the central area of sequence 1200A symbolically represents that, instead of following the top route in which a change detection image is captured, some embodiments instead periodically obtain a regular depth image. Such a process is beneficial to ensure that the environment is properly monitored. In this manner, regular depth images may be used to periodically supplement or augment the process of capturing change detection images.

As described, this augmentation, in some instances, is beneficial because it enables the MR system to ensure that it is accurately determining whether the environment has changed. As an example, suppose within a minute's time period, there are 30 frames captured. In this example, 29 of the 30 frames may be change detection images while the remaining 1 frame may be a regular depth image. Such an occurrence represents a scenario in which depth images may be interleaved among change detection images.

As another example, suppose the change detection images in sequence 1200A constitute "reduced range depth images" (e.g., reduced range depth image 645 from FIG. 6B or reduced range depth image 700 from FIG. 7) extending only up to 3 meters away from the MR system. If only 3 meters were monitored, then there is a chance that an object located beyond 3 meters might not be detected when it is moved. By augmenting sequence 1200A with a regular depth image, as shown by the triangle in the central area of sequence 1200A, then the embodiments can ensure that objects within the environment are properly monitored. It will be appreciated that the supplemental regular depth image information can be obtained, or rather interleaved, in accordance with any desired frequency.

The other sequence 1200B shows additional or alternative techniques to modify how change detection images are obtained. Initially, sequence 1200B starts in the initial scanning phase by collecting any number of regular depth images to generate the surface mesh 1210. After the initial scanning phase is complete and the surface mesh 1210 is generated, then the sequence 1200B causes change detection images to be acquired until such time as a change that satisfies a predetermined threshold in the environment is detected (as symbolically represented by the hashed square in sequence 1200B). After such an occurrence is detected, sequence 1200B shows that a regular depth image (i.e. the triangle) is computed. This regular depth image is then used to update 1215 the surface mesh. After this first update 1215, the sequence 1200B shows that different routes may be followed.

In the first route, change detection images are continued to be captured until such time as the environment again changes, as shown by the subsequent hashed square. Again, once a change is detected, then a regular depth image (i.e. the triangle) is captured, and an update 1220 to the surface mesh is performed. The ellipses 1205B symbolically represent that the sequence 1200B may continue indefinitely until such time as the MR session expires.

An alternative second route/branch is also shown within sequence 1200B. Here, the frequency by which the change detection images are captured is adjusted. In particular, the rate at which change detection images are obtained is reduced such that a longer period of time transpires in between capture events, as shown by the longer arrow between the change detection image squares.

Alternatively, a third route/branch within sequence 1200B shows that, instead of decreasing the capture rate, some embodiments actually increase the capture rate of the change detection images, as shown by the shorter arrows between the change detection image squares.

Determining the frequency of capturing regular depth images and/or change detection images can be based on different factors, one of which is the environment's context, which was introduced earlier. For instance, if an environment's context suggests that it is highly dynamic, then a relatively higher frame per second rate may be used as compared to an environment whose context suggests that it is static. Where the environment is unlikely to have very much change or there has not been a change for a period of time, then the embodiments can scale back or reduce how often they capture regular depth images and/or change detection images. On the other hand, if environmental changes are detected more frequently or if the context suggests that the environment is highly likely to change, then the embodiments can increase the capture rates.

Based on the environment's context, the MR system can then establish a repeat capture rate that is used for capturing subsequent change detection images of the environment, as shown by sequences 1200A and 1200B. Some embodiments additionally determine attributes of a particular change detection image as well as a plurality of other change detection images based on the environment's context, where the "other" change detection images are those that are to be obtained subsequent to generating the surface mesh and prior to detecting the difference between the change detection image and the surface mesh as described in act 120 of method 100 in FIG. 1.

The attributes of the change detection images may comprise one or more of: an image distance, an image field of view angle, an image resolution, an image capture frame rate, a visible light illumination source, an IR illumination frequency or intensity, or even a camera type used for obtaining the change detection image and the plurality of other change detection images. Accordingly, determining a capture rate at which the change detection image and possibly any subsequent change detection images are captured may be based, at least in part, on a determined context of the environment and/or on the attributes identified from within any of the change detection images.

From the sequences 1200A and 1200B, it will be appreciated that the embodiments are truly dynamic and can respond in different ways to changes in the environment. These different responses can be performed in a dynamic manner such that they occur in real-time on an as-needed basis.

As also shown by FIG. 12, a change detection image can be included among a plurality of change detection images. In some instances, the MR system (e.g., a HMD) will additionally capture multiple regular depth images and interleave those depth images into the sequence of change detection images, as generally shown by sequence 1200A. The change detection images are captured at a first capture rate (e.g., as shown by the squares in sequence 1200A) while the regular depth images (e.g., shown by the triangle in the central area of sequence 1200A) are captured at a second capture rate which is lower than the first capture rate. That is, after the surface mesh is generated 1210, regular interleaved depth images can periodically be acquired at a lower rate than the change detection images.

Accordingly, the disclosed embodiments substantially reduce power consumption by at least reducing how often regular depth maps are generated of an environment. Over the course of an entire MR session, substantial power savings may be realized by practicing the disclosed principles.

Example Computer System(s)

Figure 13:
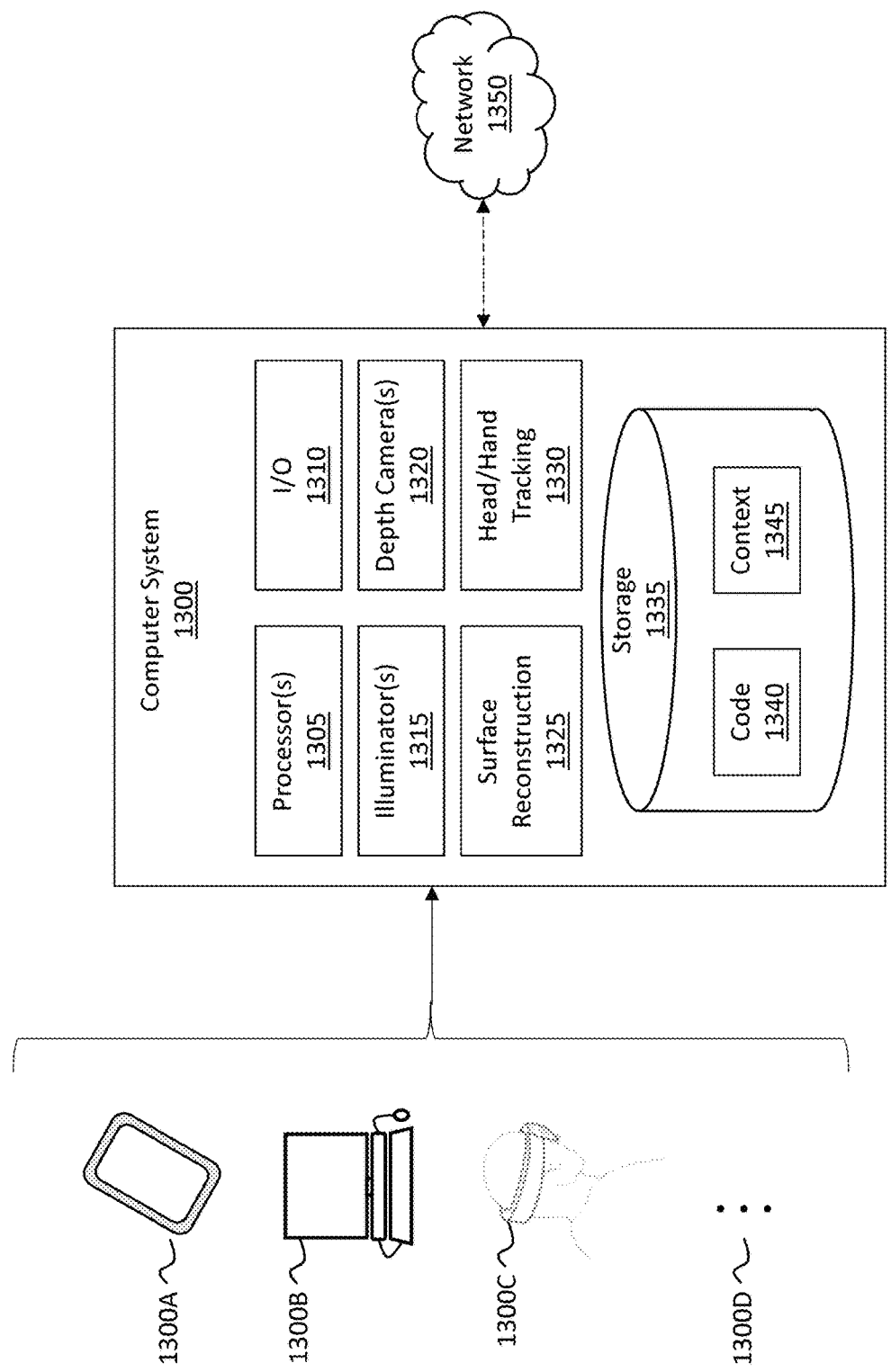
FIG. 13 illustrates an example computer system capable of performing any and/or all of the disclosed operations.

Attention will now be directed to FIG. 13 which illustrates an example computer system 1300 that may be used to facilitate the operations described herein. In particular, this computer system 1300 may be in the form of the MR systems that were described earlier.

Computer system 1300 may take various different forms. For example, in FIG. 13, computer system 1300 may be embodied as a tablet 1300A, a desktop 1300B, or a HMD 1300C. The ellipsis 1300D demonstrates that computer system 1300 may be embodied in any form. Computer system 1300 may also be a distributed system that includes one or more connected computing components/devices that are in communication with computer system 1300, a laptop computer, a mobile phone, a server, a data center, and/or any other computer system. The ellipsis 1300D also indicates that other system subcomponents may be included or attached with the computer system 1300, including, for example, sensors that are configured to detect sensor data such as user attributes (e.g., heart rate sensors), as well as sensors like cameras and other sensors that are configured to detect sensor data such as environmental conditions and location/positioning (e.g., clocks, pressure sensors, temperature sensors, gyroscopes, accelerometers and so forth), all of which sensor data may comprise different types of information used during application of the disclosed embodiments. Some of the embodiments are implemented as handheld devices or handheld depth cameras. Some embodiments are also operable in robotics, drones, ambient settings, and any type of mobile phone.

In its most basic configuration, computer system 1300 includes various different components. FIG. 13 shows that computer system 1300 includes at least one processor 1305 (aka a "hardware processing unit"), input/output ("I/O") 1310, illuminator(s) 1315, depth camera(s) 1320, a surface reconstruction engine 1325, a head/hand tracking engine 1330, and storage 1335.

Surface reconstruction engine 1325 is able to cause the depth camera(s) 1320 to scan and generate a surface mesh, or spatial mapping, of an environment. Furthermore, surface reconstruction engine 1325 can control the illuminator(s) 1315, which include visible light illuminators and/or IR light illuminators, to illuminate the environment for the depth camera(s) 1320.

Depth camera(s) 1320 may include any number of time of flight cameras, active or passive stereoscopic cameras, and/or any other type of depth cameras. Using these cameras, surface reconstruction engine 1325 is able to capture images of an environment and generate a 3D representation of that environment in the form of a surface mesh. Accordingly, surface reconstruction engine 1325 includes any hardware and/or software components necessary to generate a surface mesh/spatial mapping (which may include depth images/maps, 3D dot/point clouds, and/or 3D meshes) and may perform the operations described in method 100 of FIG. 1A or 1B. This surface mesh/spatial mapping may be used when segmenting and characterizing the objects in the real-world environment, as described earlier.

Storage 1335 is shown as including executable code/instructions 1340 and a stored context 1345 for the environment. The executable code/instruction 1340 represent instructions that are executable by the computer system to perform the disclosed operations, such as those described in method 100 of FIGS. 1A and 1B. The context 1345 represents a classification for the environment based on whether the objects in the environment are likely to move or are likely to remain stationary, as generally described earlier.

Storage 1335 may be physical system memory, which may be volatile, non-volatile, or some combination of the two. The term "memory" may also be used herein to refer to non-volatile mass storage such as physical storage media. If computer system 1300 is distributed, the processing, memory, and/or storage capability may be distributed as well. As used herein, the term "executable module," "executable component," or even "component" can refer to software objects, routines, or methods that may be executed on computer system 1300. The different components, modules, engines, and services described herein may be implemented as objects or processors that execute on computer system 1300 (e.g. as separate threads).

The disclosed embodiments may comprise or utilize a special-purpose or general-purpose computer including computer hardware, such as, for example, one or more processors (such as processor 1305) and system memory (such as storage 1335), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1300 may also be connected (via a wired or wireless connection) to external sensors (e.g., one or more remote cameras, accelerometers, gyroscopes, acoustic sensors, magnetometers, etc.). Further, computer system 1300 may also be connected through one or more wired or wireless networks 1350 to remote/separate computer systems(s) that are configured to perform any of the processing described with regard to computer system 1300.

During use, a user of computer system 1300 is able to perceive information (e.g., a MR environment (including VR or AR)) through a display screen that is included with the I/O 1310 of computer system 1300 and that is visible to the user. The I/O 1310 and sensors with the I/O 1310 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the mixed-reality environment.

A graphics rendering engine may also be configured, with processor 1305, to render one or more virtual objects within a mixed-reality environment. As a result, the virtual objects accurately move in response to a movement of the user and/or in response to user input as the user interacts within the virtual scene.

A "network," like the network 1350 shown in FIG. 13, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1300 will include one or more communication channels that are used to communicate with the network 1350. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1305). For example, and without limitation, illustrative types of hardware logic components that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more depth cameras;
   one or more processors; and
   one or more computer-readable hardware storage devices having stored thereon computer-executable instructions that are executable by the one or more processors to cause the computer system to:
   generate a surface mesh of an environment from a plurality of depth maps that are obtained of the environment;
   after the surface mesh is generated, capture a change detection image of the environment while refraining from obtaining a new depth map of the environment, wherein a power consumption amount used when capturing the change detection image is lower than a power consumption amount used when capturing a depth image used to generate any one depth map included in the plurality of depth maps;
   compare the change detection image to the surface mesh to determine whether a difference between the change detection image and the surface mesh satisfies a pre-determined difference threshold;
   in response to determining that the difference between the change detection image and the surface mesh satisfies the pre-determined difference threshold, obtain a new depth map of the environment and update the surface mesh with the new depth map; and
   in response to determining that the difference between the change detection image and the surface mesh fails to satisfy the pre-determined difference threshold, refrain from obtaining a new depth map.

2. The computer system of claim 1, wherein the one or more depth cameras capture depth images to generate the plurality of depth maps, and wherein the depth images are captured at a first frame per second rate.

3. The computer system of claim 2, wherein capturing the change detection image of the environment is performed at a second frame per second rate, the second frame per second rate being lower than the first frame per second rate.

4. The computer system of claim 1, wherein the change detection image is a reduced range depth image captured with a reduced illumination range as compared with an illumination range used to obtain any one depth map of the plurality of depth maps.

5. The computer system of claim 1, wherein the change detection image is a reduced resolution depth image captured with a reduced image resolution as compared with an image resolution used to obtain any one depth map of the plurality of depth maps.

6. The computer system of claim 1, wherein the change detection image is a depth map computed using a reduced number of raw input infrared images than used for a regular depth map.

7. The computer system of claim 1, wherein the change detection image is an ambient infrared (IR) image that was captured while the computer system refrained from illuminating the environment with IR spectrum illumination light.

8. The computer system of claim 1, wherein the one or more depth cameras are time of flight depth cameras.

9. The computer system of claim 1, wherein execution of the computer-executable instructions further causes the computer system to:
segment objects located within the environment to determine a corresponding classification for each one of the objects, the classifications being used to generate a context for the environment; and
based on the environment's context, establish a repeat capture rate that is used for capturing a plurality of subsequent change detection images of the environment.

10. The computer system of claim 1, wherein, in response to determining the difference between the change detection image and the surface mesh does not satisfy the pre-determined difference threshold, the change detection image is discarded and is refrained from being used to update the surface mesh.

11. The computer system of claim 1, wherein execution of the computer-executable instructions further causes the computer system to:
detect a context of the environment; and
based on the environment's context, determine attributes of the change detection image and a plurality of other change detection images to be obtained subsequent to generating the surface mesh and prior to detecting the difference between the change detection image and the surface mesh.

12. The computer system of claim 11, wherein the attributes of the change detection image comprise one or more of:
an image distance,
an image field of view angle,
an image resolution,
an image capture frame rate,
an infrared (IR) illumination modulation frequency, or
a camera type used for obtaining the change detection image and the plurality of other change detection images.

13. A method for reducing power consumption of a depth camera system that is used to perform surface reconstruction and that includes one or more depth cameras, the method being implemented by a computer system that includes the depth camera system and comprising:
generating a surface mesh of an environment from a plurality of depth maps that are obtained of the environment;
after the surface mesh is generated, capturing a change detection image of the environment while refraining from obtaining a new depth map of the environment, wherein a power consumption amount used when capturing the change detection image is lower than a power consumption amount used when capturing a depth image used to generate anyone depth map included in the plurality of depth maps, wherein the change detection image is at least one of:
a reduced range depth image captured with a reduced illumination range as compared with an illumination range used to obtain the any one depth map of the plurality of depth maps,
a reduced resolution depth image captured with a reduced image resolution as compared with an image resolution used to obtain any one depth map of the plurality of depth maps, or
a reduced infrared (IR) frame captured using a reduced number of raw input infrared images as compared with a number of raw input infrared images used to obtain any one depth map of the plurality of depth maps;
comparing the change detection image to the surface mesh;
in response to detecting a difference between the change detection image and the surface mesh, which difference satisfies a pre-determined difference threshold, obtaining a new depth map of the environment; and
updating the surface mesh with the new depth map.

14. The method of claim 13, wherein:
the change detection image is one of a plurality of change detection images,
the depth camera system additionally captures a plurality of depth images,
the change detection images included in the plurality of change detection images are captured at a first capture rate, and
the depth images included in the plurality of depth images are captured at a second capture rate which is lower than the first capture rate.

15. The method of claim 13, wherein detecting the difference between the change detection image and the surface mesh includes:
determining a current pose of the depth camera system;
based on the current pose of the depth camera system, re-projecting the surface mesh to generate an expected surface mesh; and
comparing the change detection image to the expected surface mesh.

16. The method of claim 13, wherein reducing power consumption of the depth camera system is performed by reducing how much illuminated light is projected by one or more camera illuminators of the depth camera system as compared with how much illuminated light is projected by the one or more camera illuminators of the depth camera system to obtain any one depth map of the plurality of depth maps.

17. A head-mounted device (HMD) comprising:
a display;
one or more depth cameras;
one or more processors; and
one or more computer-readable hardware storage devices having stored thereon computer-executable instructions that are executable by the one or more processors to cause the HMD to:

generate a surface mesh of an environment from a plurality of depth maps that are obtained of the environment;

after the surface mesh is generated, capture a change detection image of the environment while refraining from obtaining a new depth map of the environment, wherein a power consumption amount used when capturing the change detection image is lower than a power consumption amount used when capturing a depth image used to generate any one depth map included in the plurality of depth maps;

compare the change detection image to the surface mesh to determine whether a difference between the change detection image and the surface mesh satisfies a predetermined difference threshold;

in response to determining that the difference between the change detection image and the surface mesh satisfies the pre-determined difference threshold, obtain a new depth map of the environment, update the surface mesh with the new depth map, and render an image based on the surface mesh, after it is updated, at the display; and in response to determining that the difference between the change detection image and the surface mesh fails to satisfy the pre-determined difference threshold, refrain from obtaining a new depth map.

18. The HMD of claim 17, wherein the change detection image is a combination of at least two of the following:
   a reduced range depth image captured with a reduced illumination range as compared with an illumination range used to obtain any one depth map of the plurality of depth maps,
   a reduced resolution depth image captured with a reduced image resolution as compared with an image resolution used to obtain any one depth map of the plurality of depth maps,
   a reduced infrared (IR) frame captured using a reduced number of raw input infrared images as compared with a number of raw input infrared images used to obtain any one depth map of the plurality of depth maps, or
   an ambient IR image that was captured while the HMD refrained from illuminating the environment with IR spectrum illumination light.

19. The HMD of claim 17, wherein determining a capture rate at which the change detection image and subsequent change detection images are captured is based, at least in part, on a determined context of the environment.

* * * * *